United States Patent
Kinoshita et al.

(10) Patent No.: US 9,253,388 B2
(45) Date of Patent: Feb. 2, 2016

(54) IMAGE PROCESSING DEVICE AND METHOD, AND PROGRAM

(75) Inventors: Masaya Kinoshita, Kanagawa (JP); Yutaka Yoneda, Kanagawa (JP); Takashi Kameya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 629 days.

(21) Appl. No.: 13/321,395

(22) PCT Filed: Mar. 15, 2011

(86) PCT No.: PCT/JP2011/056107
§ 371 (c)(1),
(2), (4) Date: Nov. 18, 2011

(87) PCT Pub. No.: WO2011/122335
PCT Pub. Date: Oct. 6, 2011

(65) Prior Publication Data
US 2012/0062769 A1     Mar. 15, 2012

(30) Foreign Application Priority Data
Mar. 30, 2010     (JP) ................................. 2010 079185

(51) Int. Cl.
*H04N 5/232*     (2006.01)
*G03B 5/00*     (2006.01)

(52) U.S. Cl.
CPC ................. *H04N 5/232* (2013.01); *G03B 5/00* (2013.01); *H04N 5/23296* (2013.01)

(58) Field of Classification Search
CPC ....... H04N 5/232; H04N 5/23296; G03B 5/00
See application file for complete search history.

(56) References Cited

U.S. PATENT DOCUMENTS

| 6,636,694 | B1 | 10/2003 | Misumi et al. |
| 2003/0026605 | A1 | 2/2003 | Misumi et al. |
| 2004/0207743 | A1* | 10/2004 | Nozaki et al. ............ 348/333.12 |
| 2007/0230821 | A1 | 10/2007 | Akahori |

(Continued)

FOREIGN PATENT DOCUMENTS

| EP | 2 106 127 A2 | 9/2009 |
| JP | 2000 292852 | 10/2000 |

(Continued)

OTHER PUBLICATIONS

Extended European Search Report Issued Mar. 14, 2013 in Patent Application No. 11762575.6.

(Continued)

*Primary Examiner* — Jason Flohre
(74) *Attorney, Agent, or Firm* — Oblon, McClelland, Maier & Neustadt, L.L.P.

(57) ABSTRACT

The present invention relates to an image processing device and method, and a program whereby a subject can be imaged in a simpler manner with a desired imaging range.
A size ratio calculating unit 553 calculates a size ratio between a region of interest that is a region of a subject of interest, and a partial region that is the region of a portion of the subject included in the region of interest with an imaged image that has been imaged, and a lens driving control unit 556 controls the zoom power of an imaged image according to a zoom operation by a user so that the size ratio calculated by the size ratio calculating unit 553, and a predetermined value match or generally match. The present invention may be applied to an imaging apparatus.

17 Claims, 30 Drawing Sheets

(56) References Cited

U.S. PATENT DOCUMENTS

| | | |
|---|---|---|
| 2008/0205869 A1* | 8/2008 | Nose .............................. 396/77 |
| 2008/0246852 A1* | 10/2008 | Mori .......................... 348/222.1 |
| 2009/0141367 A1 | 6/2009 | Guan |
| 2009/0256933 A1 | 10/2009 | Mizukami |
| 2010/0039535 A1 | 2/2010 | Maeda |
| 2010/0149383 A1* | 6/2010 | Maeda et al. .............. 348/240.3 |
| 2010/0177159 A1* | 7/2010 | Tojo ........................... 348/14.16 |
| 2010/0194927 A1 | 8/2010 | Nose |
| 2010/0195994 A1 | 8/2010 | Nose |
| 2011/0013039 A1 | 1/2011 | Aisaka et al. |
| 2011/0080504 A1 | 4/2011 | Akahori |
| 2011/0188758 A1 | 8/2011 | Kinoshita et al. |
| 2011/0206282 A1 | 8/2011 | Aisaka et al. |
| 2011/0242347 A1 | 10/2011 | Kinoshita |

FOREIGN PATENT DOCUMENTS

| | | |
|---|---|---|
| JP | 2005-318515 A | 11/2005 |
| JP | 2009-10888 A | 1/2009 |
| JP | 2009 033450 | 2/2009 |
| JP | 2009 181130 | 8/2009 |
| JP | 2009 232151 | 10/2009 |
| JP | 2010-48994 A | 3/2010 |

OTHER PUBLICATIONS

U.S. Appl. No. 13/002,958, filed Jan. 6, 2011, Aisaka, et al.

International Search Report Issued Jun. 14, 2011 in PCT/JP11/056107 Filed Mar. 15, 2011.

Office Action issued Dec. 26, 2013, in Japanese Patent Application No. 2010-079185.

Combined Chinese Office Action and Search Report issued Jan. 6, 2014 in Chinese Patent Application No. 201180002162.3 with English translation.

\* cited by examiner

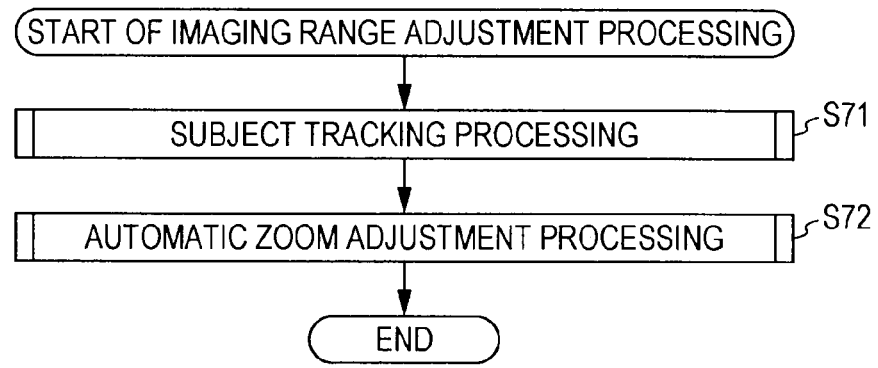
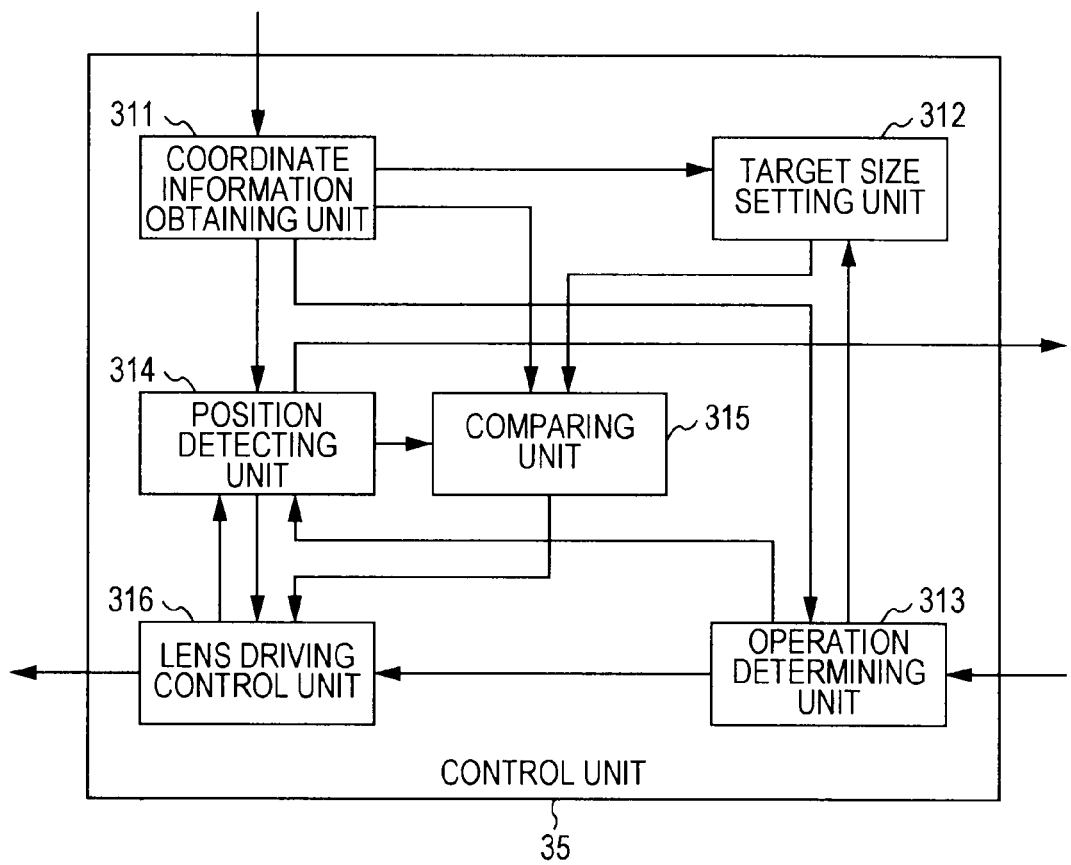

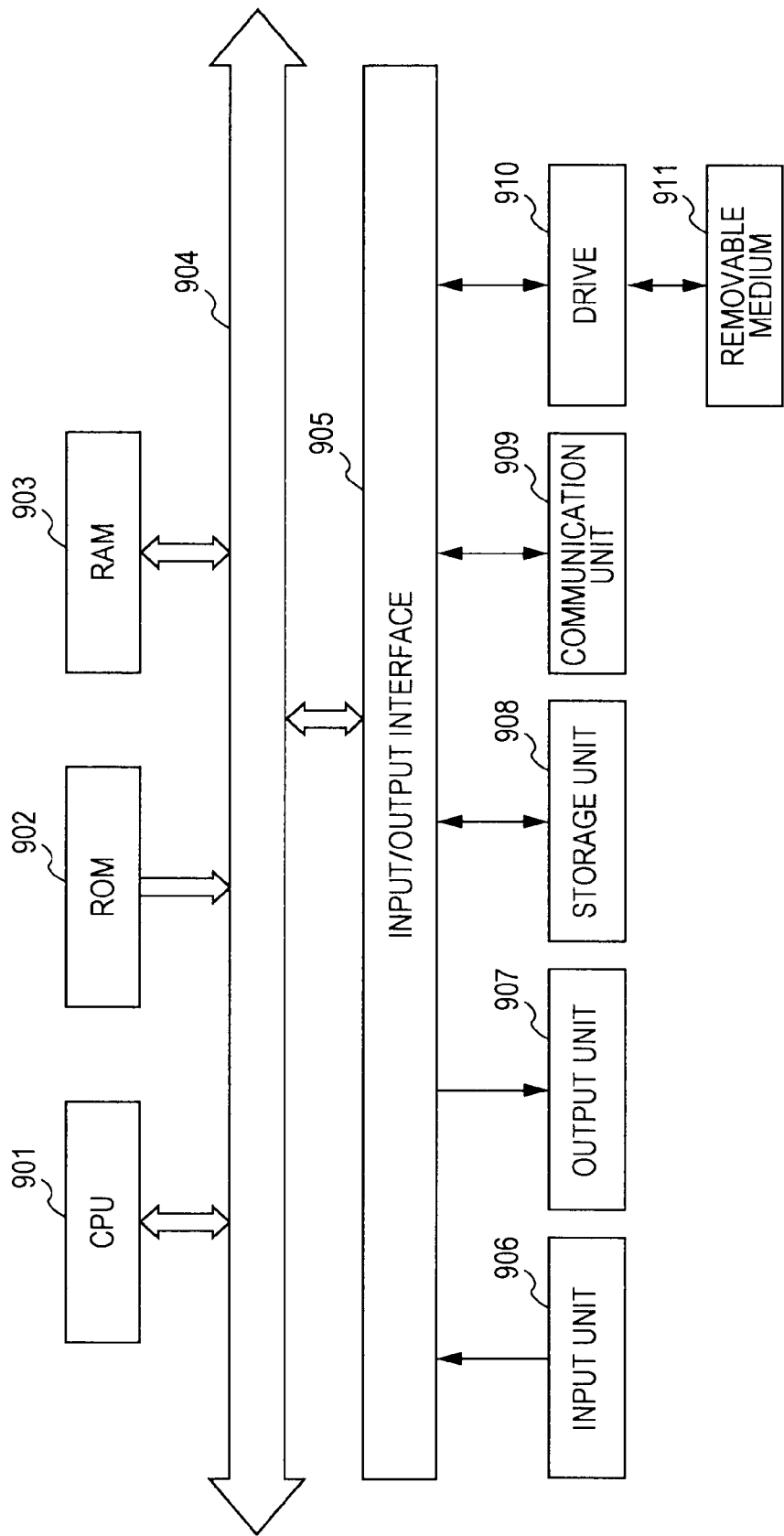

IMAGE PROCESSING DEVICE AND METHOD, AND PROGRAM

TECHNICAL FIELD

The present invention relates to an image processing device and method, and a program, and specifically relates to an image processing device and method, and a program which enable a subject to be imaged with a desired imaging range.

BACKGROUND ART

In recent years, with imaging apparatuses such as digital cameras and so forth, arrangements have been made wherein after a subject such as a person or face is detected by a detector, the subject is imaged in a more suitable manner using functions such as autofocus (AF), automatic exposure (AE), and so forth.

Incidentally, there has been an imaging apparatus for performing adjustment of an imaging range (angle of view) by a zoom operation, which tracks a subject, subjects the subject to zoom out when the subject enters the region of an edge of the imaging range, and subjects the subject to zoom in when the subject enters the center region of the imaging range (see PTL 1).

CITATION LIST

Patent Literature

PTL 1: Japanese Unexamined Patent Application Publication No. 2009-33450

SUMMARY OF INVENTION

Technical Problem

However, the above-mentioned imaging apparatus cannot obtain a desired imaging range by a more simplified operation regarding adjustment of an imaging range according to a zoom operation.

For example, in the event that distance with a subject changes at the time of imaging, in order to fixedly maintain the size of the subject in an imaging range, a delicate zoom operation has to be performed according to the distance thereof. Also, even when the distance with the subject is constant, in order to change the size of the subject in an imaging range to a desired size, a delicate zoom operation also has to be performed.

Particularly, in recent years, a button or lever for performing a zoom operation has also been reduced in size along with reduction in the sizes of imaging apparatuses, and thus, adjustment of an imaging range by the zoom operation has become difficult.

The present invention has been made in light of such a situation, and in particular to image a subject with a desired imaging range in a simpler manner.

Solution to Problem

An image processing device according to a first aspect of the present invention includes imaging means configured to image a subject; calculating means configured to calculate a ratio between a region of interest that is a region of the subject of interest, and a partial region that is the region of a portion of the subject included in the region of interest, with an imaged image imaged by the imaging means; and power control means configured to control the zoom power of the imaged image according to a zoom operation by a user so that the ratio calculated by the calculating means, and a predetermined value match or generally match.

The image processing device may further include storage means configured to store the predetermined value beforehand; and determining means configured to determine whether or not the ratio calculated by the calculating means, and the predetermined value stored by the storage means match or generally match, for each frame, with the power control means controlling the zoom power by the determining means until determination is made that the ratio and the predetermined value match or generally match.

The calculating means may calculate a ratio between the heights of the region of interest, and the partial region serving as rectangular regions.

The calculating means may calculate a ratio between a person region that is the region of a person serving as the subject of interest, and a face region that is the region of the face of the person included in the person region, with an imaged image imaged by the imaging means.

The power control means may control driving of a zoom lens according to a zoom operation by the user so that the ratio calculated by the calculating means, and the predetermined value match or generally match.

The power control means may control electronic enlargement of the imaged image according to a zoom operation by the user so that the ratio calculated by the calculating means, and the predetermined value match or generally match.

The image processing device may further include comparing means configured to compare the size of the region of interest, and a predetermined target size with the imaged image, with the power control means controlling, in the event that a zoom operation has not been performed by the user, the zoom power of the imaged image so that difference between the size of the region of interest and the target size compared by the comparing means is smaller than a predetermined threshold.

The power control means may control the zoom power of the imaged image according to the zoom operation at the time of a zoom operation being performed by the user while controlling the zoom power of the imaged image so that difference between the size of the region of interest, and the target size is smaller than the predetermined threshold, with setting means configured to set the target size to the size of the region of interest after a zoom operation has been performed by the user being further provided to the image processing device.

The image processing device may further include detecting means configured to detect the position of the region of interest in the imaged image, with the power control means controlling the zoom power of the imaged image toward the wide-angle side in the event that the detecting means detects that the position of the region of interest is in the outer edge region of the imaged image.

The image processing device may further include presenting means configured to present information to the effect that the subject is out of the imaged image in the event that the zoom power of the imaged image becomes a wide-angle end by the control of the zoom control means.

An image processing method according to the first aspect of the present invention is an image processing method of an image processing device which includes imaging means configured to image a subject, calculating means configured to calculate a ratio between a region of interest that is a region of the subject of interest, and a partial region that is the region of a portion of the subject included in the region of interest, with an imaged image imaged by the imaging means, and power control means configured to control the zoom power of the imaged image according to a zoom operation by a user so that the ratio calculated by the calculating means, and a predetermined value match or generally match, and includes a calculating step for the calculating means calculating a ratio between a region of interest that is a region of the subject of interest, and a partial region that is the region of a portion of the subject included in the region of interest, with an imaged image imaged by the imaging means; and a power control step for the power control means controlling the zoom power of the imaged image according to a zoom operation by a user so that the ratio calculated by the processing in the calculating step, and a predetermined value match or generally match.

A program according to the first aspect of the present invention is a program causing a computer to execute image processing of an image processing device which includes imaging means for imaging a subject, causing the computer to execute processing including a calculating step for calculating a ratio between a region of interest that is a region of the subject of interest, and a partial region that is the region of a portion of the subject included in the region of interest, with an imaged image imaged by the imaging means; and a power control step for controlling the zoom power of the imaged image according to a zoom operation by a user so that the ratio calculated by the processing in the calculating step, and a predetermined value match or generally match.

With the first aspect of the present invention, a subject is imaged, a ratio between a region of interest that is a region of the subject of interest, and a partial region that is the region of a portion of the subject included in the region of interest is calculated with an imaged image that has been imaged, the zoom power of the imaged image according to a zoom operation by a user is controlled so that the calculated ratio and a predetermined value match or generally match.

An image processing device according to a second aspect of the present invention includes imaging means configured to image a subject; detecting means configured to detect a region of interest that is the region of the subject of interest by predetermined image processing with an imaged image imaged by the imaging means; comparing means configured to compare between the size of the region of interest detected by the detecting means, and predetermined target size; and power control means configured to control the zoom power of the imaged image so that difference between the size of the region of interest, and the target size compared by the comparing means is smaller than a predetermined threshold.

An image processing method according to the second aspect of the present invention is an image processing method of an image processing device which includes imaging means configured to image a subject, detecting means configured to detect a region of interest that is the region of the subject of interest by predetermined image processing with an imaged image imaged by the imaging means, comparing means configured to compare between the size of the region of interest detected by the detecting means, and predetermined target size, and power control means configured to control the zoom power of the imaged image so that difference between the size of the region of interest, and the target size compared by the comparing means is smaller than a predetermined threshold, and includes: a detecting step for detecting a region of interest that is the region of the subject of interest by predetermined image processing with an imaged image imaged by the imaging means; a comparing step for comparing between the size of the region of interest detected by the processing in the detecting step, and predetermined target size; and a power control step for controlling the zoom power of the imaged image so that difference between the size of the region of interest, and the target size compared by the processing in the comparing step is smaller than a predetermined threshold.

With the second aspect of the present invention, a subject is imaged, a region of interest that is the region of the subject of interest is detected with an imaged image that has been imaged by predetermined image processing, the size of the detected region of interest, and a predetermined target size are compared, and the zoom power of the imaged image is controlled so that difference between the size of the region of interest, and the target size that were compared is smaller than a predetermined threshold.

Advantageous Effects of Invention

According to the first and second aspects of the present invention, a subject may be imaged with a desired imaging range in a simpler manner.

BRIEF DESCRIPTION OF DRAWINGS

FIG. 14 is a flowchart for describing imaging range adjustment processing.

FIG. 15 is a block diagram illustrating a functional configuration example of a control unit.

FIG. 35 is a block diagram illustrating a configuration example of the hardware of a computer.

DESCRIPTION OF EMBODIMENTS

Embodiments of the present invention will be described below with reference to the drawings.
[Configuration Example of Image Processing Device]

Figure 1:
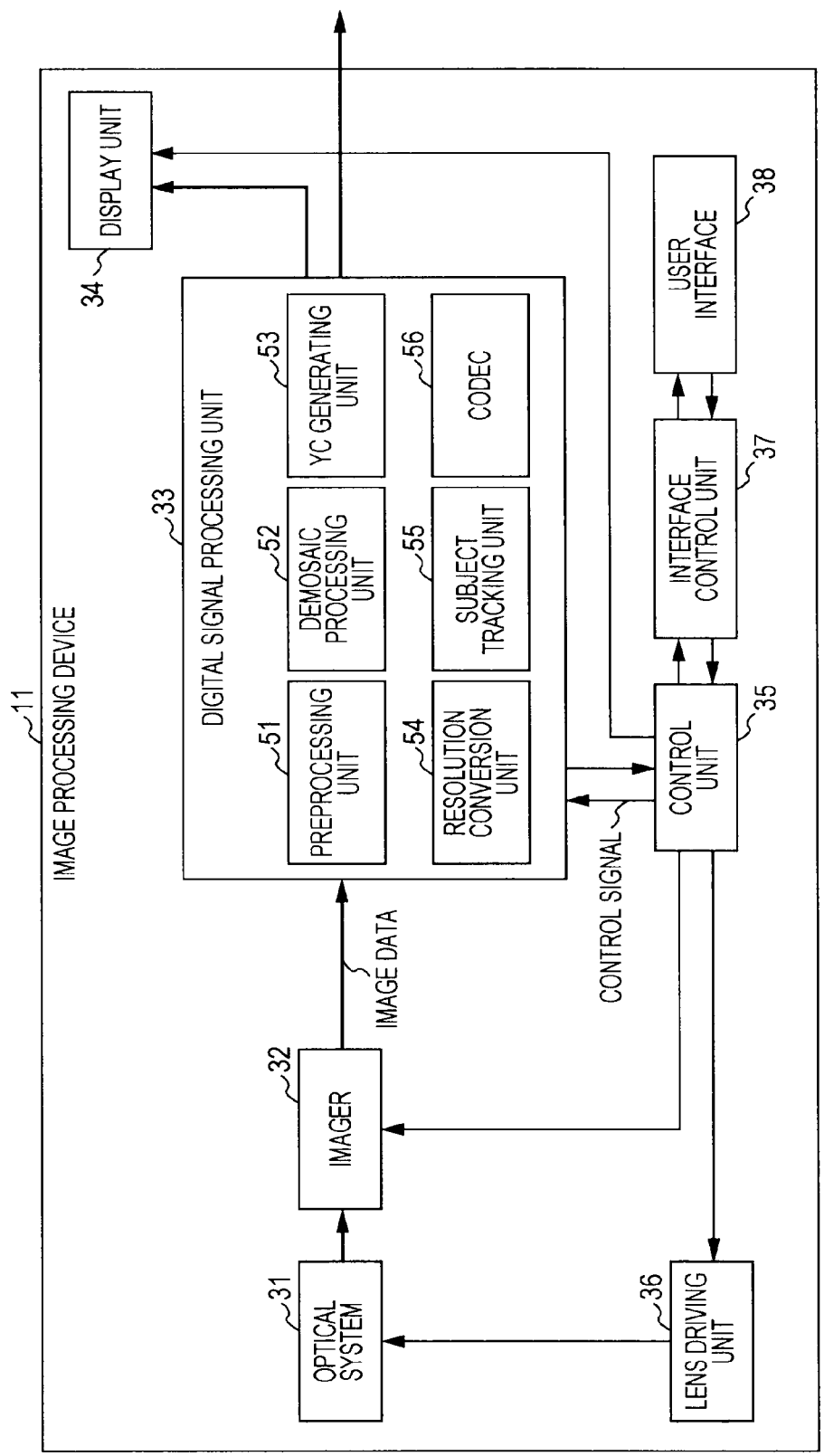
FIG. 1 is a block diagram illustrating a configuration example of an embodiment of an image processing device to which the present invention has been applied.

FIG. 1 is a diagram illustrating a configuration example of an embodiment of an image processing device to which the present invention has been applied.

An imager processing device 11 is provided to an imaging apparatus, for example, such as a digital video camera, a digital still camera, and so forth which image subjects with motion.

The image processing device 11 is configured of an optical system 31, an imager 32, a digital signal processing unit 33, a display unit 34, a control unit 35, a lens driving unit 36, an interface control unit 37, and a user interface 38.

The optical system 31 is configured as an optical system including a zoom lens and a focus lens which are not shown in the drawing. Light input to the optical system 31 is subjected to photoelectric conversion by the imager 32 made up of an imaging device such as CCD (Charge Coupled Device) or the like. The electrical signal (analog signal) subjected to photoelectric conversion by the imager 32 is converted into the image data of a digital signal by an unshown A/D (Analog to Digital) conversion unit, and supplied to the digital signal processing unit 33.

The digital signal processing unit 33 subjects the digital signal (image data) from the imager 32 to predetermined signal processing. The digital signal processing unit 33 includes a preprocessing unit 51, a demosaic processing unit 52, a YC generating unit 53, a resolution conversion unit 54, a subject tracking unit 55, and a CODEC 56.

The preprocessing unit 51 subjects the image data from the imager 32 to clamp processing for clamping the black levels of R, G, and B to a predetermined level, correction processing between color channels of R, G, and B, or the like, as preprocessing. The demosaic processing unit 52 subjects the image data subjected to preprocessing by the preprocessing unit 51 to demosaic processing for complementing pixel color components so that each pixel of the image data has the color components of all of R, G, and B.

The YC generating unit 53 generates (separates) a luminance (Y) signal and a color (C) signal from the image data of R, G, and B subjected to demosaic processing by the demosaic processing unit 52. The resolution conversion unit 54 executes resolution conversion processing as to the image data processed at the YC generating unit 53.

The subject tracking unit 55 executes subject tracking processing for detecting a subject in the input image (imaged image) corresponding to the image data based on the image data made up of the luminance signal and color signal generated by the YC generating unit 53, and tracking this.

Here, detection of a subject is performed assuming that in the event that the user has a glance at an input image, an object on the input image that is estimated to be focused by the user, i.e., an object that is estimated to have the user's attention is determined to be a subject. Accordingly, a subject is not necessarily restricted to a person.

The subject tracking unit 55 supplies data regarding a subject frame representing a region including a subject in the input image obtained as a result of the subject tracking processing to the control unit 35. Note that the details of the subject tracking unit 55 will be described later with reference to FIG. 2.

The CODEC 56 encodes the image data generated at the YC generating unit 53 or resolution conversion unit 54 according to need, and records this in unshown memory, or decodes the encoded image data. The image data decoded at the CODEC 56, or the image data obtained at the resolution conversion unit 54 is supplied to the display unit 34 for display. The display unit 34 is made up of, for example, a liquid crystal display or the like, and displays the input image corresponding to the image data (hereafter, also referred to as "imaged image" as appropriate) supplied from the digital signal processing unit 33 in accordance with the control of the control unit 35.

The control unit 35 controls the units of the image processing device 11 according to the control signal supplied from the interface control unit 37.

For example, the control unit 35 supplies parameters used for various types of signal processing, and so forth to the digital signal processing unit 33, and also obtains the data obtained as a result of various types of signal processing from the digital signal processing unit 33, and supplies to the interface control unit 37.

Also, the control unit 35 supplies control signals for driving the zoom lens and focus lens making up the optical system 31, or adjusting the diaphragm or the like, to the lens driving unit 36. Further, the control unit 35 also controls imaging of an input image by the imager 32.

The user interface 38 is configured of an input device such as a button, a lever, a switch, a microphone, and so forth which are operated at the time of the user inputting an instruction as to the image processing device 11, and an output device such as a lamp, a speaker, and so forth which present information as to the user, and so forth.

For example, upon a button serving as the user interface 38 being operated, the user interface 38 supplies the control signal according to the operation thereof to the control unit 35 via the interface control unit 37.
[Configuration Example of Subject Tracking Unit]

Next, a configuration example of the subject tracking unit 55 in FIG. 1 will be described with reference to FIG. 2.

Figure 2:
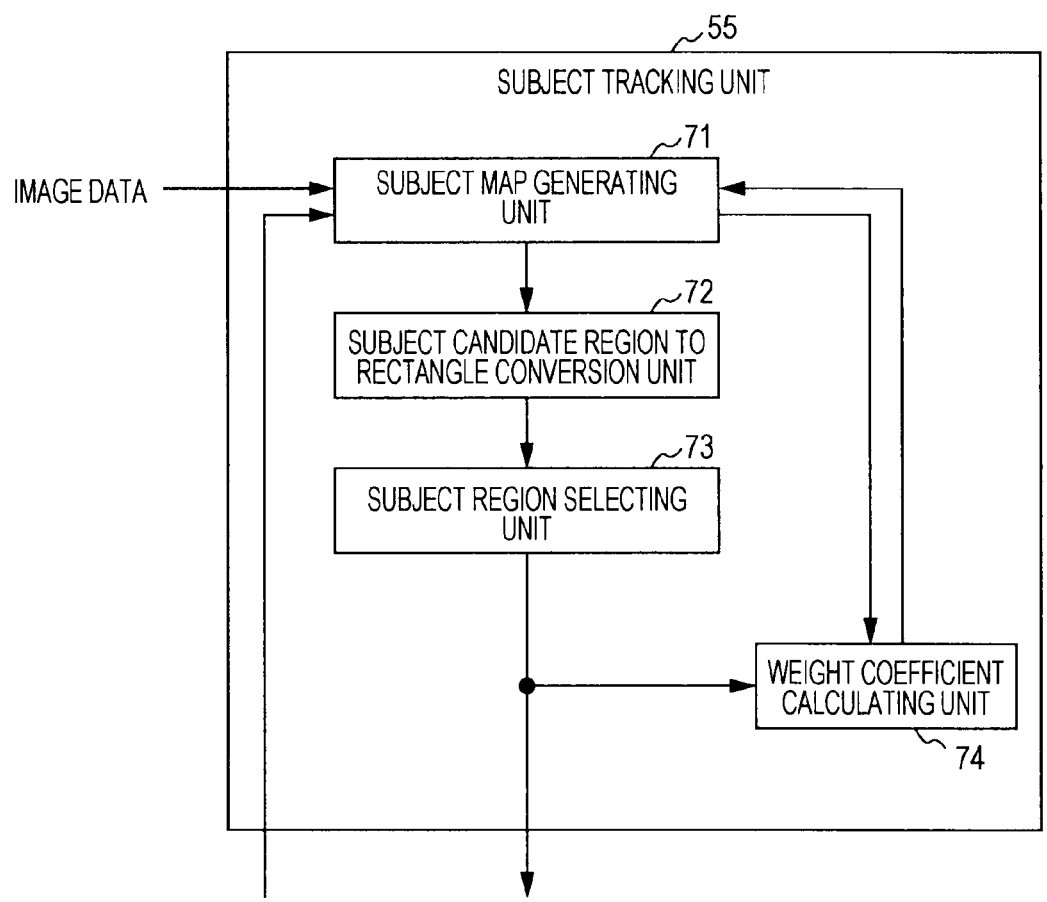
FIG. 2 is a block diagram illustrating a configuration example of a subject tracking unit.

The subject tracking unit 55 in FIG. 2 is configured of a subject map generating unit 71, a subject candidate region to rectangle conversion unit 72, a subject region selecting unit 73, and a weight coefficient calculating unit 74.

The subject map generating unit 71 generates a feature amount map indicating the feature amount in a predetermined region of a predetermined frame of an input image for each feature such as luminance, color, and so forth included in the input image, and supplies to the weight coefficient calculating unit 74. Also, the subject map generating unit 71 generates a subject map indicating the region likelihood of a subject in the input image based on the generated feature amount map, and the weight coefficient for each feature amount supplied from the weight coefficient calculating unit 74.

More specifically, the subject map generating unit 71 performs addition with weight for each region positioned in the same position regarding the information (feature amount) of each region of the feature amount map for each feature to generate a subject map. The subject map generating unit 71 supplies the generated subject map to the subject candidate region to rectangle conversion unit 72.

Note that, with each feature amount map, a region where the information amount is higher, i.e., a region on the input image corresponding to a region having higher feature amount becomes a region having a higher possibility that a subject will be included, and accordingly, a region including a subject in the input image may be determined according to each feature amount map.

With the subject map from the subject map generating unit 71, the subject candidate region to rectangle conversion unit 72 obtains a region serving as a candidate for a subject, i.e., a rectangular region including a region having higher information amount in the subject map, and supplies coordinate information representing the coordinates of the rectangular region thereof to the subject region selecting unit 73. Also, the subject candidate region to rectangle conversion unit 72 calculates information regarding the rectangular region represented by the coordinate information on the subject map (hereafter, referred to as region information), and supplies to the subject region selecting unit 73 in a manner correlated with the coordinate information.

The subject region selecting unit 73 selects a subject region to be tracked that is a rectangular region in which a subject of interest is included out of rectangular regions based on the region information from the subject candidate region to rectangle conversion unit 72, and supplies the coordinate information of the subject region thereof to the control unit 35 (FIG. 1) and weight coefficient calculating unit 74.

The weight coefficient calculating unit 74 calculates a weight coefficient for weighting the feature amount map of the next frame corresponding to relatively great feature amount of the feature amount in the region corresponding to the subject region on each feature amount map of a predetermined frame from the subject map generating unit 71, and supplies to the subject map generating unit 71.

According to such a configuration, the subject tracking unit 55 can obtain a subject frame representing a subject region for each frame of an input image.

[Configuration Example of Subject Map Generating Unit]

Next, a configuration example of the subject map generating unit 71 in FIG. 2 will be described with reference to FIG. 3.

Figure 3:
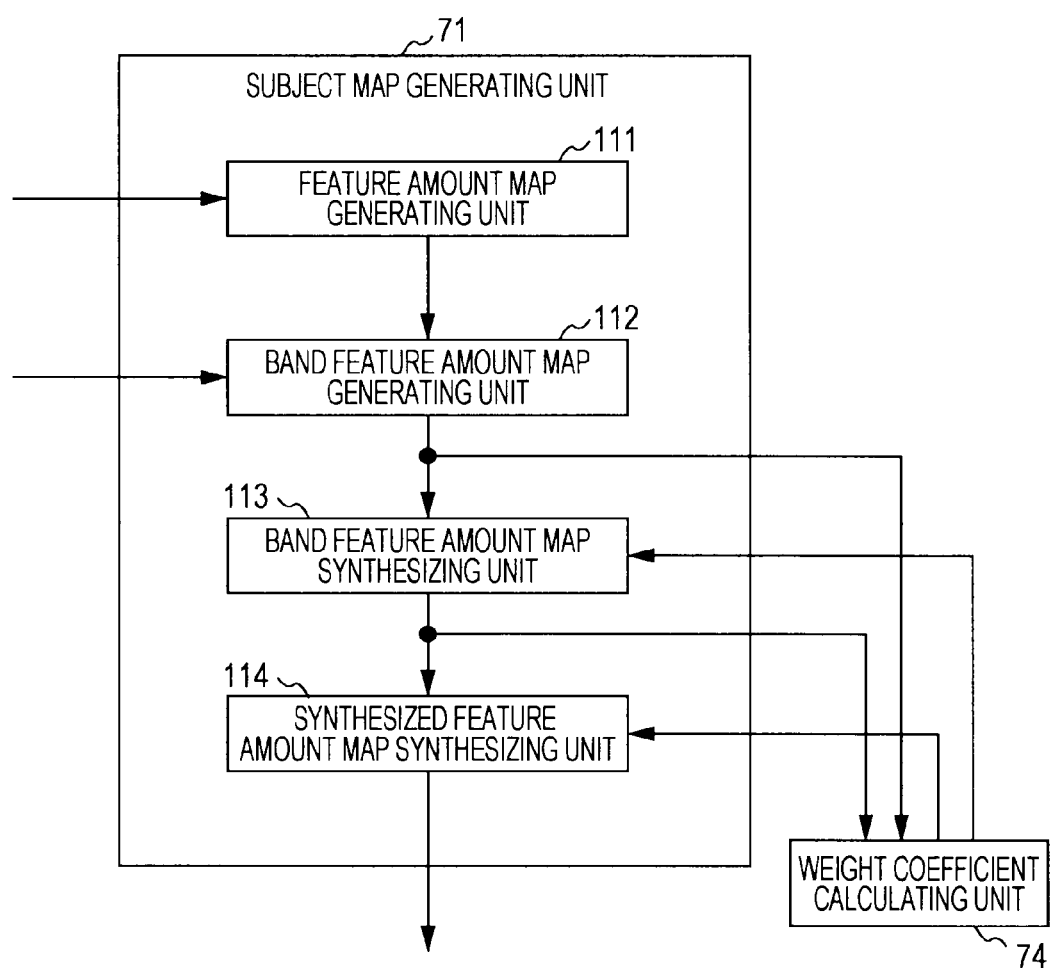
FIG. 3 is a block diagram illustrating a configuration example of a subject map generating unit.

The subject map generating unit 71 in FIG. 3 is configured of a feature amount map generating unit 111, a band feature amount map generating unit 112, a band feature amount map synthesizing unit 113, and a synthesized feature amount map synthesizing unit 114.

The feature amount map generating unit 111 generates a feature amount map indicating information (feature amount) regarding features such as luminance or color for each feature amount from a predetermined frame of an input image, and supplies to the band feature amount map generating unit 112.

The band feature amount map generating unit 112 extracts the feature amount of a predetermined band component from the feature amount in each feature amount map from the feature amount map generating unit 111 by a predetermined number of times, generates a band feature amount map indicating the extracted feature amounts, and supplies to the weight coefficient calculating unit 74 and band feature amount map synthesizing unit 113.

The band feature amount map synthesizing unit 113 synthesizes the band feature amount map from the band feature mount map generating unit 112 for each feature amount based on the weight coefficient from the weight coefficient calculating unit 74 to generating a synthesized feature amount map, and supplies to the weight coefficient calculating unit 74 and synthesized feature amount map synthesizing unit 114.

The synthesized feature amount map synthesizing unit 114 synthesizes the synthesized feature amount map from the band feature amount map synthesizing unit 113 based on the weight coefficient from the weight coefficient calculating unit 74 to generate a subject map, and supplies to the subject candidate region to rectangle conversion unit 72 (FIG. 2).

Here, with the following description, the above-mentioned band feature amount map and synthesized feature amount map will be simply referred to as a feature amount map.

[Configuration Example of Subject Candidate Region to Rectangle Conversion Unit]

Next, a configuration example of the subject candidate region to rectangle conversion unit 72 in FIG. 2 will be described with reference to FIG. 4.

Figure 4:
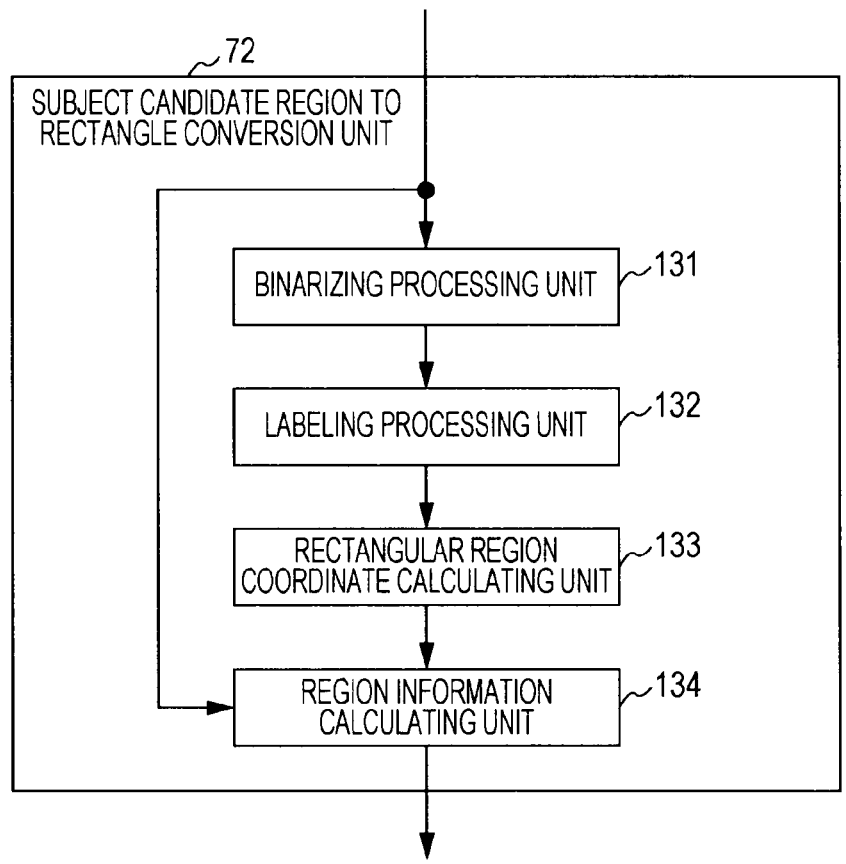
FIG. 4 is a block diagram illustrating a configuration example of a subject candidate region to rectangle conversion unit.

The subject candidate region to rectangle conversion unit 72 in FIG. 4 is configured of a binarizing processing unit 131, a labeling processing unit 132, a rectangular region coordinate calculating unit 133, and a region information calculating unit 134.

The binarizing processing unit 131 binarizes information corresponding to each pixel of an input image in the subject map supplied from the subject map generating unit 71 into either value of 0 or 1 based on a predetermined threshold, and supplies to the labeling processing unit 132. Here, with the following description, information corresponding to each pixel of the input image in the subject map will also simply be referred to as a pixel.

The labeling processing unit 132 performs labeling as to a region adjacent to a pixel of which the value is 1 (hereafter, referred to as connection region) in the binarized subject map from the binarizing processing unit 131, and supplies to the rectangular region coordinate calculating unit 133.

The rectangular region coordinate calculating unit 133 calculates the coordinates of a rectangular region including (surrounding) a connection region in the subject map where the connection region is labeled from the labeling processing unit 132, and supplies coordinate information representing the coordinates thereof to the region information calculating unit 134 along with the subject map.

The region information calculating unit 134 calculates region information that is information relating a rectangular region represented with the coordinate information on the subject map from the rectangular region coordinate calculating unit 133, and supplies to the subject region selecting unit 73 (FIG. 1) in a manner correlated with the coordinate information.

[Configuration Example of Subject Region Selecting Unit]

Next, a configuration example of the subject region selecting unit 73 will be described with reference to FIG. 5.

Figure 5:
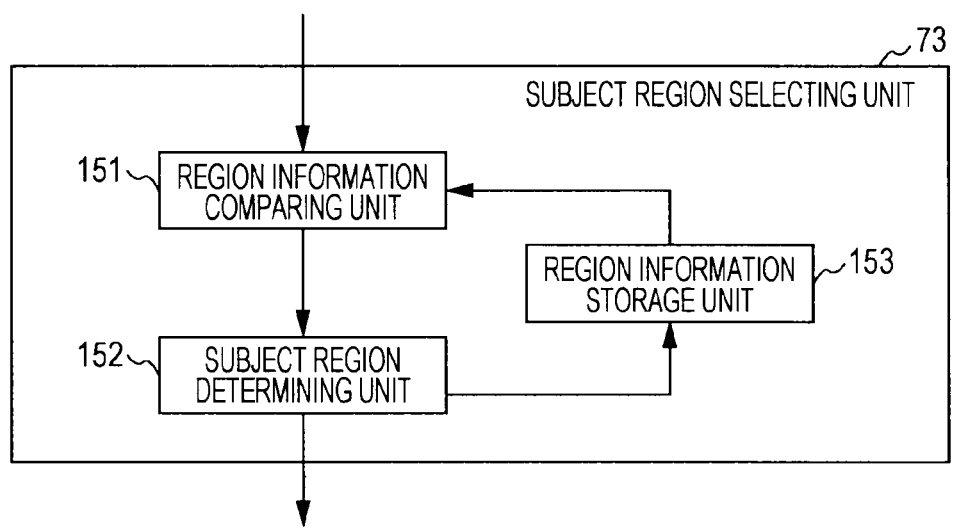
FIG. 5 is a block diagram illustrating a configuration example of a subject region selecting unit.

The subject region selecting unit 73 in FIG. 5 is configured of a region information comparing unit 151 and a subject region determining unit 152.

The region information comparing unit 151 compares the region information of each rectangular region from the subject candidate region to rectangle conversion unit 72, and the region information of the subject region of one frame ahead stored in a region information storage unit 153, and supplies the comparison results to the subject region determining unit 252.

The subject region determining unit 152 takes the rectangular region represented with the coordinate information correlated with the region information most approximate to the region information of the subject region of one frame ahead as a subject region based on the comparison results from the region information comparing unit 151. The subject region determining unit 152 supplies the coordinate information of the determined subject region to the control unit 35 (FIG. 1) and the weight coefficient calculating unit 74 (FIG. 2), and also supplies the region information of the subject region to the region information storage unit 153.

The region information storage unit 153 stores the region information of the subject region from the subject region determining unit 152. The region information of the subject region stored in the region information storage unit 153 is read out by the region information comparing unit 151 after one frame.

[Subject Tracking Processing]

The subject tracking processing of the image processing device 11 will be described below.

Figure 6:
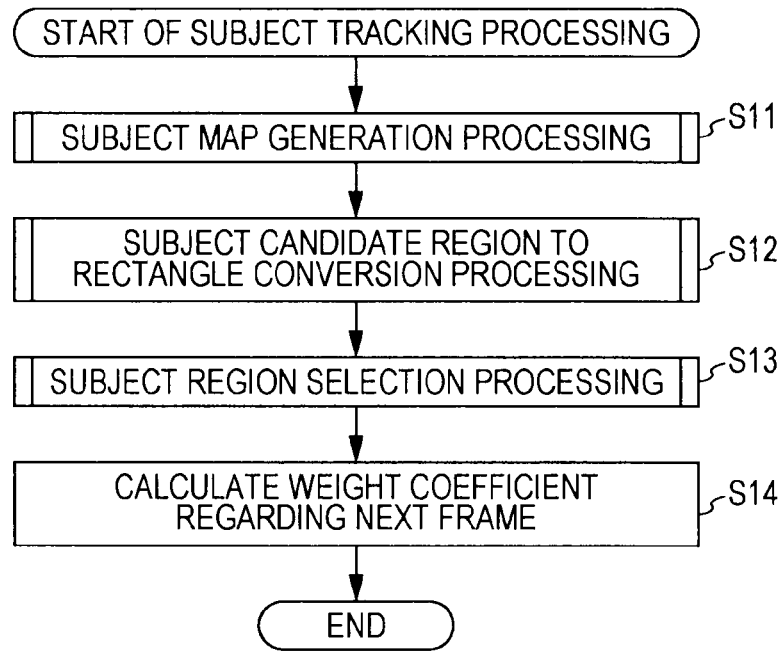
FIG. 6 is a flowchart for describing subject tracking processing.

FIG. 6 is a flowchart for describing the subject tracking processing of the image processing device 11. The subject tracking processing is started, for example, when the operation mode of the image processing device 11 proceeds to a subject tracking processing mode for executing the subject tracking processing by the user operating the user interface 38 serving as a button, and a predetermined region of a subject serving as a tracking object is selected in the input image displayed on the display unit 34 by the user.

In step S11, the subject map generating unit 71 of the subject tracking unit 55 performs subject map generation processing to generate a subject map, and supplies to the subject candidate region to rectangle conversion unit 72.

[Subject Map Generation Processing]

Figure 7:
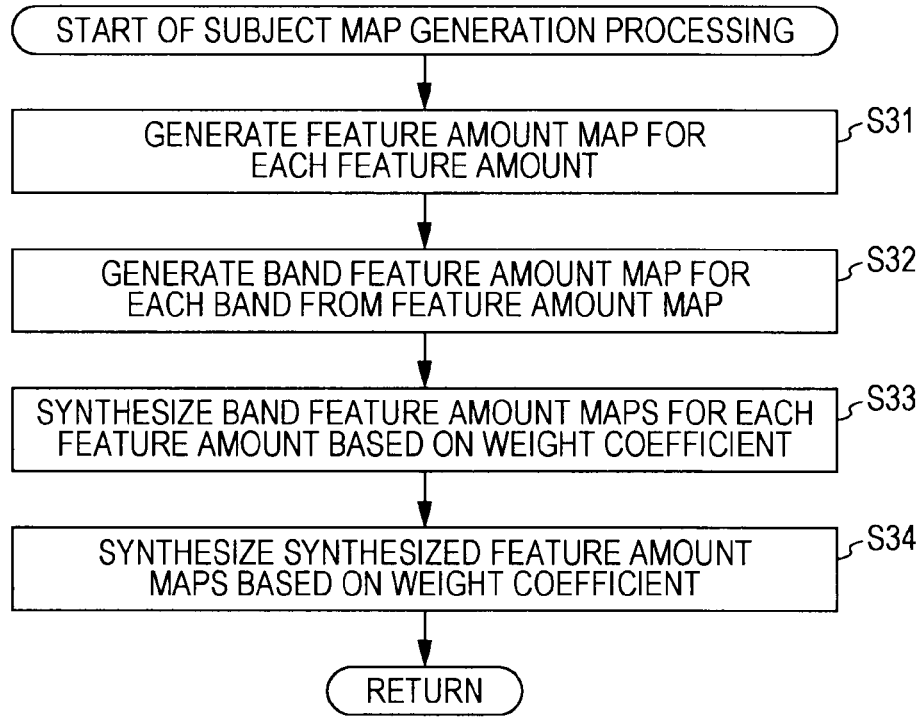
FIG. 7 is a flowchart for describing subject map generation processing.
Figure 8:
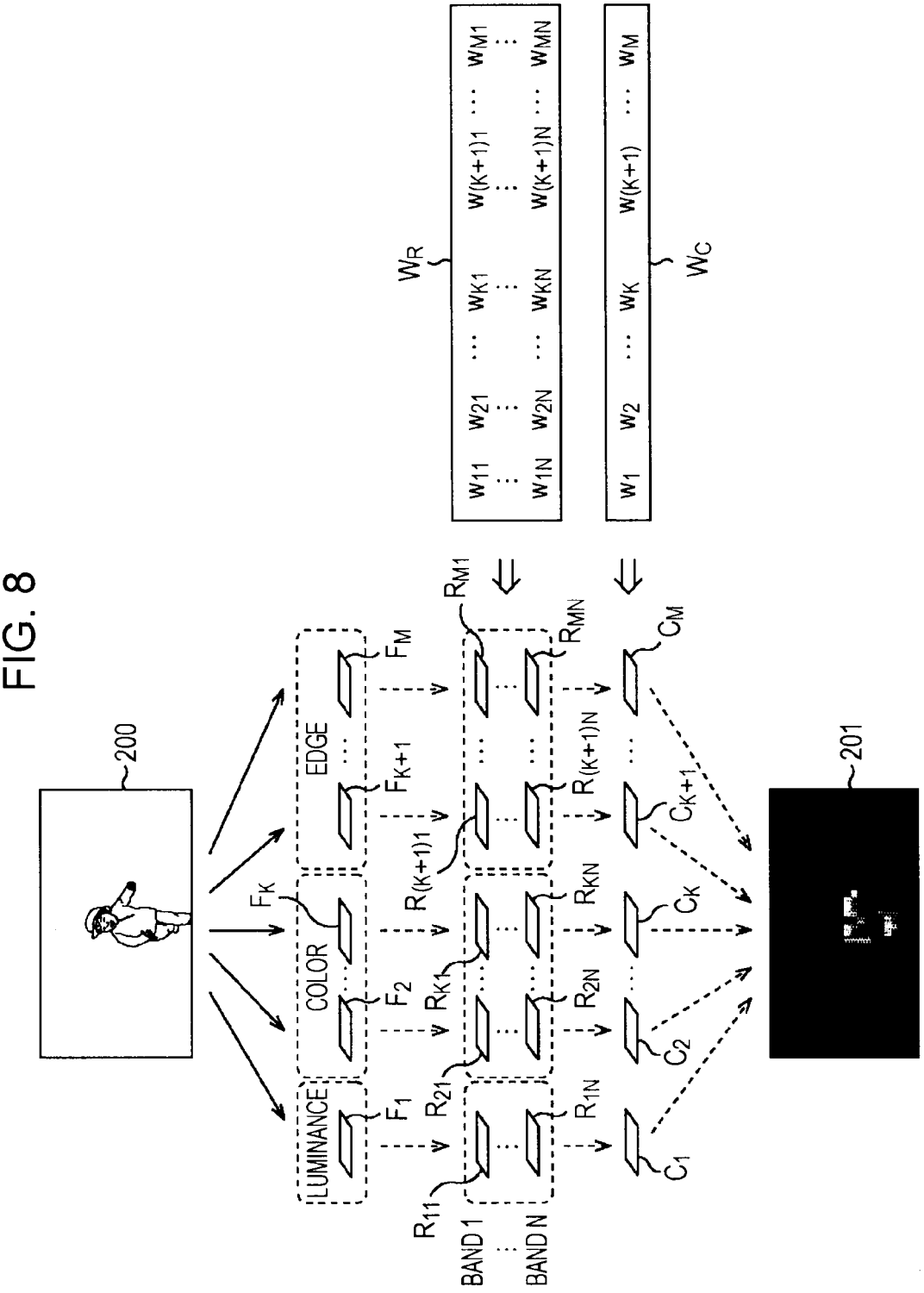
FIG. 8 is a diagram illustrating a specific example of the subject map generation processing.

Now, the details of the subject map generation processing will be described with reference to FIG. 7 and FIG. 8. FIG. 7 is a flowchart for describing the subject map generation processing. FIG. 8 is a diagram illustrating a specific example of the subject map generation processing.

In step S31 in the flowchart in FIG. 7, the feature amount map generating unit 111 of the subject map generating unit 71 generates a feature amount map regarding features of luminance, color, and so forth (for each feature amount), and supplies to the band feature amount map generating unit 112.

Specifically, as shown in FIG. 8, M types of feature amount maps of a luminance information map $F_1$ indicating information regarding luminance, color information maps $F_2$ through $F_K$ indicating information regarding colors, and edge information maps $F_{(K+1)}$ through $F_M$ indicating information regarding edges, are generated from an input image 200.

With the luminance information map $F_1$, a luminance component (luminance signal) Y obtained from each pixel of the input image becomes information corresponding to each pixel of the input image, and with the color information maps $F_2$ through $F_K$, color components (color signals) R, G, and B obtained from each pixel of the input image become information corresponding to each pixel of the input image. Also, with the edge information maps $F_{(K+1)}$ through $F_M$, for example, edge intensities in the directions of 0°, 45°, 90°, and 135° at each pixel of the input image become information corresponding to each pixel of the input image.

Note that, with regard to the above-mentioned feature amount maps, an average value of the values of the components R, G, and B of a pixel may be taken as the information (feature amount) of the luminance information map $F_1$, and color difference components Cr and Cb, and a* coordinate component and b* coordinate component in the Lab color space may be taken as the color information maps $F_2$ through $F_K$. Also, edge intensities in directions other than 0°, 45°, 90°, and 135° may be taken as the edge information maps $F_{(K+1)}$ through $F_M$.

In step S32, the band feature amount map generating unit 112 extracts the feature amount of a predetermined band component from the feature amount in each feature amount map N times, generates a band feature amount map indicating each of the extracted feature amounts, and supplies to the weight coefficient calculating unit 74 and band feature amount map synthesizing unit 113.

Specifically, as shown in FIG. 8, the luminance information of predetermined band 1 through band N are extracted from the luminance information in the luminance information map $F_1$, band luminance information maps $R_{11}$ through $R_{1N}$ indicating the luminance information of the bands are generated. Also, the color information of predetermined band 1 through band N are extracted from the color information in the color information maps $F_2$ through $F_K$, and band color information maps $R_{21}$ through $R_{2N}, \ldots, R_{K1}$ through $R_{KN}$ indicating the color information of the bands thereof are generated. The edge information of predetermined band 1 through band N are extracted from the edge information in the edge information maps $F_{(K+1)}$ through $F_M$, and band edge information maps $R_{(K+1)1}$ through $R_{(K+1)N}, \ldots, R_{M1}$ through $R_{MN}$ indicating the edge information of the bands thereof are generated. In this way, the band feature amount map generating unit 112 generates (M×N) types of band feature amount maps.

Now, an example of the processing of the band feature amount map generating unit 112 will be described.

For example, the band feature amount map generating unit 112 uses the feature amount maps to generate multiple feature amount maps having mutually different resolution, and takes these feature amount maps as a pyramid image of the feature amounts thereof. For example, let us say that pyramid images of eight-resolution hierarchies of level L1 through level L8 are generated, the pyramid image of the level L1 has the highest resolution, and the resolutions of the pyramid images decrease in order from the level L1 to the level L8.

In this case, the feature amount map generated by the feature amount map generating unit 111 is taken as the pyramid image of the level L1. Also, the average value of the pixel values of four mutually adjacent pixels in the pyramid image of the level Li (however, 1≤i≤7) is taken as the pixel value of one pixel of the pyramid image of the level L(i+1) corresponding to these pixels. Accordingly, the pyramid image of the level L(i+1) becomes an image of a half in every direction (omission of fractions in the indivisible case) as to the pyramid image of the level Li.

Also, the band feature amount map generating unit 112 selects two pyramid images having a mutually different hierarchy of the multiple pyramid images, obtains difference between the selected pyramid images, and generates N difference images of each feature amount. Note that the pyramid image of each hierarchy differs in size (number of pixels), and accordingly, a smaller pyramid image is up-converted in accordance with a greater pyramid image at the time of generating a difference image.

For example, the band feature amount map generating unit 112 obtains, of the pyramid images of the feature amounts of the hierarchies, the difference of the pyramid images of the hierarchical combinations of the level L6 and level L3, level L7 and level L3, level L7 and level L4, level L8 and level L4, and level L8 and level L5. Thus, the difference images of a total of five feature amounts are obtained.

Specifically, for example, in the event that a difference image of a combination of the level L6 and level L3 is generated, the pyramid image of the level L6 is up-converted in accordance with the size of the pyramid image of the level L3. That is to say, the pixel value of one pixel of the pyramid image of the level L6 before up-conversion is taken as the pixel values of mutually adjacent several pixels of the pyramid image of the level L6 after up-conversion corresponding to that pixel. Difference between the pixel value of a pixel of the pyramid image of the level L6, and the pixel value of a pixel of the pyramid image of the level L3 positioned in the same position as that pixel is obtained, and the difference thereof is taken as the pixel value of the pixel of the difference image.

A difference image is thus generated, whereby the feature amount of a predetermined band component can be extracted from a feature amount map so as to subject the feature amount map to filter processing using a band-pass filter.

Note that, with the following description, the width of a band to be extracted from a feature amount map is determined by a combination of the hierarchies of the pyramid images at the time of obtaining a difference image, but this combination is optionally determined.

Also, extraction of the feature amount of a predetermined band component is not restricted to the above-mentioned technique using a difference image, and another technique may be employed.

Now, description will return to the flowchart in FIG. 7. In step S33, the band feature amount map synthesizing unit 113 synthesizes the band feature amount map from the band feature amount map generating unit 112 for each feature amount based on a weight coefficient group $W_R$ from the weight coefficient calculating unit 74. The band feature amount map synthesizing unit 113 supplies the synthesized band feature amount map (synthesized feature amount map) to the weight coefficient calculating unit 74 and synthesized feature amount map synthesizing unit 114.

Specifically, as shown in FIG. 8, band luminance information maps $R_{11}$ through $R_{1N}$ are subjected to addition with weight using weight coefficients $w_{11}$ through $w_{1N}$ that are weight for each band luminance information map from the weight coefficient calculating unit 74, and a synthesized feature amount map $C_1$ is obtained. Also, band color information maps $R_{21}$ through $R_{2N}, \ldots, R_{K1}$ through $R_{KN}$ are subjected to addition with weight using weight coefficients $w_{21}$ through $w_{2N}, \ldots, w_{K1}$ through $w_{KN}$ that are weight for each band color information map from the weight coefficient calculating unit 74, and synthesized feature amount maps $C_2$ through $C_K$ are obtained. Further, band edge information maps $R_{(K+1)1}$ through $R_{(K+1)N}, \ldots, R_{M1}$ through $R_{MN}$ are subjected to addition with weight using weight coefficients $w_{(K+1)1}$ through $w_{(K+1)N}, \ldots, w_{M1}$ through $w_{MN}$ that are weight for each band edge information map from the weight coefficient calculating unit 74, and synthesized feature amount maps $C_{K+1}$ through $C_M$ are obtained. In this way, the band feature amount map synthesizing unit 113 generates M types of synthesized feature amount maps. Note that, though the details of the weight coefficient group $W_R$ will be describe later, the weight coefficients of the weight coefficient group $W_R$ have a value of 0 to 1. However, with the first subject map generation processing, the weight coefficients of the weight coefficient group $W_R$ are all set to 1, and the band feature amount maps are added without weight.

In step S34, the synthesized feature amount map synthesizing unit 114 synthesizes the synthesized feature amount map from the band feature amount map synthesizing unit 113 based on the weight coefficient group $W_C$ from the weight coefficient calculating unit 74 to generate a subject map, and supplies to the subject candidate region to rectangle conversion unit 72.

Specifically, as shown in FIG. 8, the synthesized feature amount maps $C_1$ through $C_M$ are linear-combined using weight coefficients $w_1$ through $w_M$ that are weight for each band luminance information map from the weight coefficient calculating unit 74. Further, the pixel values of the maps obtained as a result of linear combination are multiplied for normalization by the weight of a subject that is weight obtained beforehand, and a subject map 201 is obtained. Note that, though the details of the weight coefficient group $W_C$ will be described later, the weight coefficients of the weight coefficient group $W_C$ have a value of 0 to 1. However, with the first subject map generation processing, the weight coefficients of the weight coefficient group $W_C$ are all set to 1, and the synthesized feature amount maps are linear-combined without weight.

That is to say, if we say that a position (pixel) of interest on a subject map to be obtained from now on is taken as a position of interest, the pixel value of the same position (pixel) as the position of interest of each synthesized feature amount map is multiplied by the weight coefficient for each synthesized feature amount map, and summation of pixel values multiplied by the weight coefficient is taken as the pixel value of the position of interest. Further, the pixel value thus obtained of each position of the subject map is multiplied for normalization by subject weight obtained beforehand as to the subject map, and is taken as the final subject map. For example, normalization is performed so that the pixel value of each pixel of the subject map becomes a value of 0 to 255.

The subject map generating unit 71 generates a band feature amount map and a synthesized feature amount map in this way, thereby generating a subject map.

Now, description will return to the flowchart in FIG. 6. In step S12, the subject candidate region to rectangle conversion unit 72 performs subject candidate region to rectangle conversion processing to obtain a rectangular region including a region serving as a subject candidate in the subject map from the subject map generating unit 71.

[Subject Candidate Region to Rectangle Conversion Processing]

Figure 9:
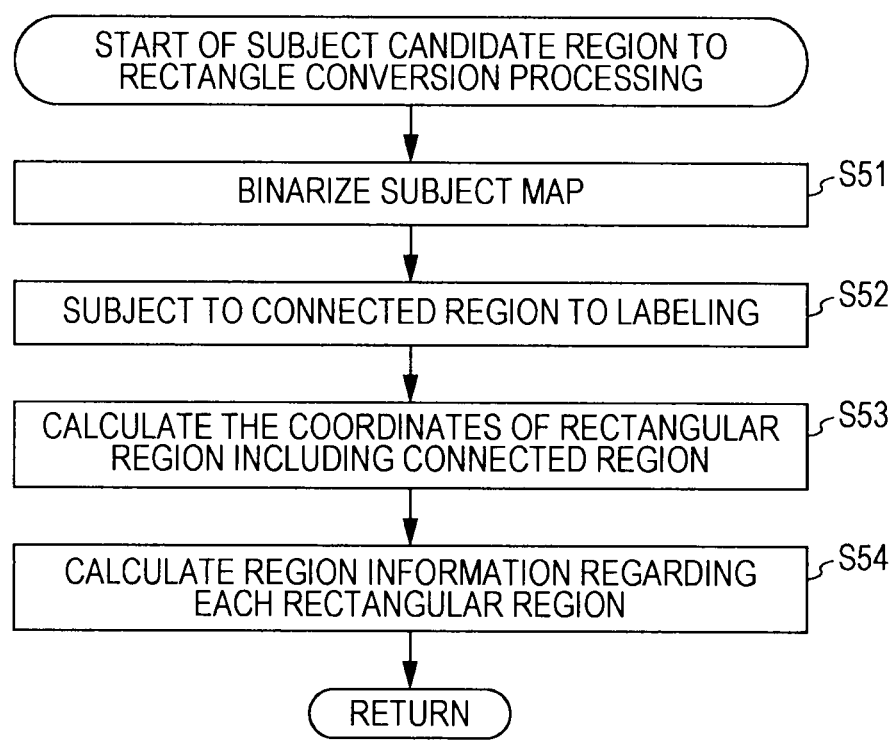
FIG. 9 is a flowchart for describing subject candidate region to rectangle conversion processing.

Now, the details of the subject candidate region to rectangle conversion processing will be described with reference to FIG. 9 and FIG. 10. FIG. 9 is a flowchart for describing the subject candidate region to rectangle conversion processing, and FIG. 10 is a diagram illustrating a specific example of the subject candidate region to rectangle conversion processing.

In step S51 in the flowchart in FIG. 9, the binarizing processing unit 131 of the subject candidate region to rectangle conversion unit 72 binarizes information in the subject map supplied from the subject map generating unit 71 to a value of either 0 or 1 based on a predetermined threshold, and supplies to the labeling processing unit 132.

Figure 10:
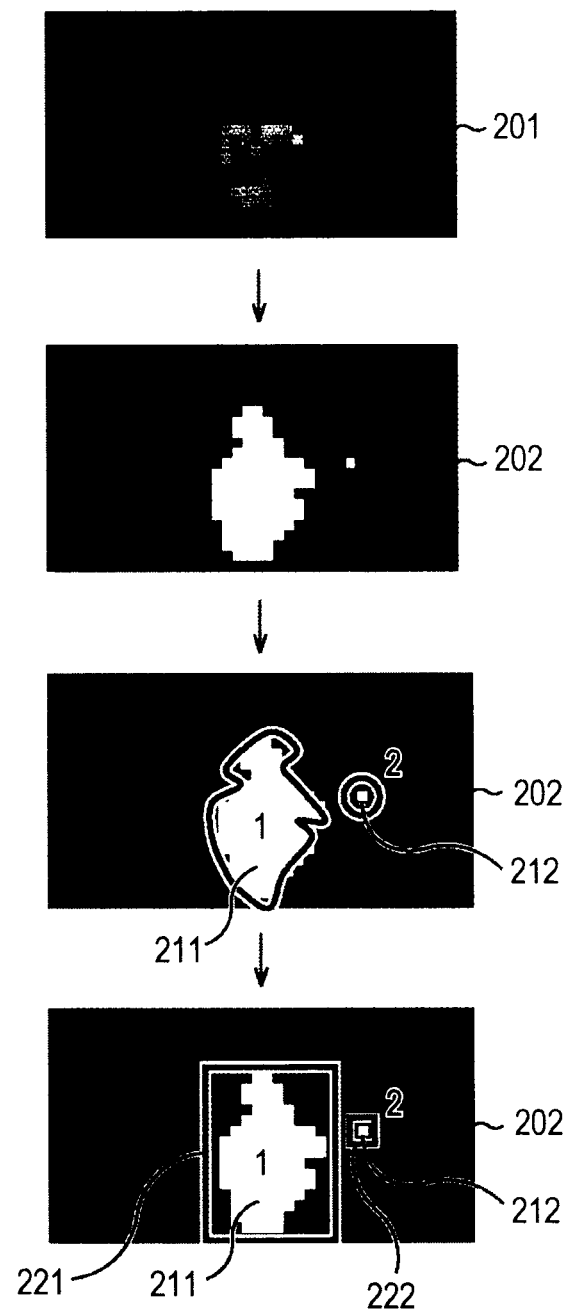
FIG. 10 is a diagram illustrating a specific example of the subject candidate region to rectangle conversion processing.

More specifically, the binarizing processing unit 131 sets the pixel value of each pixel of the subject map 201 shown at the first from the top in FIG. 10 that is a value of 0 to 255 to, for example, 0 if the pixel value is a value smaller than a threshold 127, and 1 if the pixel value is a value greater than 127. Thus, a binarized map 202 such as shown in the second from the top of FIG. 10 is obtained. With the binarized map 202 shown in FIG. 10, a portion indicated with white (pixel) has a pixel value of 1, and a portion indicated with black (pixel) has a pixel value of 0. Note that through the threshold has been represented with 127, another value may be employed.

In step S52, with the binarized map 202 (binarized subject map) from the binarizing processing unit 131, the labeling processing unit 132 subjects a connection region where pixels having a pixel value of 1 obtained, for example, by morphology operation or the like adjoin to labeling, and supplies to the rectangular region coordinate calculating unit 133.

More specifically, for example, as shown in the third from the top of FIG. 10, with the binarized map 202, a connection region 211 is subjected to labeling with a label "1", and a connection region 212 is subjected to labeling with a label "2".

In step S53, the rectangular region coordinate calculating unit 133 calculates, with the binarized map 202 from the labeling processing unit 132, the coordinates of a rectangular region including (surrounding) a connection region, and supplies coordinate information representing the coordinates thereof to the region information calculating unit 134 along with the binarized map 202.

More specifically, as shown in the fourth from the top of FIG. 10, with the binarized map 202, a rectangular frame (circumscribing frame) 221 surrounding the connection region 211 subjected to labeling with a label "1" from the outside is detected, and the coordinates of an upper left apex and lower right apex of the rectangular frame thereof in the drawing are obtained, for example. Also, a rectangular frame 222 surrounding the connection region 212 subjected to labeling with a label "2" from the outside is detected, and the coordinates of an upper left apex and lower right apex of the rectangular frame thereof in the drawing are obtained, for example.

In step S54, the region information calculating unit 134 calculates, based on the coordinate information from the rectangular region coordinate calculating unit 71 and the subject map from the subject map generating unit 133, region information regarding the rectangular region surrounded with a rectangular frame on the subject map.

More specifically, the region information calculating unit 134 calculates, based on the coordinate information from the rectangular region coordinate calculating unit 133 that represent the rectangular frames 221 and 222 in the binarized map 202, the sizes of the rectangular frames, and the coordinate of the center position as region information regarding the rectangular region. The region information calculating unit 134 supplies the calculated region information to the subject region selecting unit 73 in a manner correlated with the coordinate information from the rectangular region coordinate calculating unit 133.

In this way, the subject candidate region to rectangle conversion unit 72 obtains, with the subject map, a rectangular frame surrounding each region serving as a candidate of the subject of interest, and region information representing the features of a region surrounded with the rectangular frame thereof on the subject map.

Now, description will return to the flowchart in FIG. 6. In step S13, the subject region selecting unit 73 performs subject region selection processing to select a subject region that is a rectangular region in which the subject of interest is included out of rectangular regions based on the region information from the subject region selecting unit 73.

[Subject Region Selection Processing]

Figure 11:
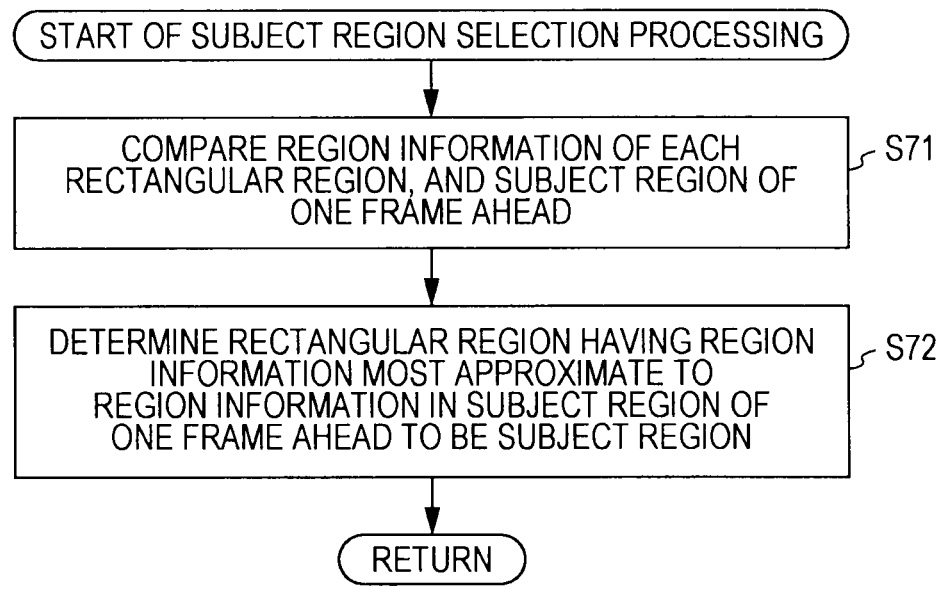
FIG. 11 is a flowchart for describing subject region selection processing.

Now, the details of the subject region selection processing will be described with reference to the flowchart in FIG. 11.

In step S71, the region information comparing unit 151 compares the region information of each rectangular region from the subject candidate region to rectangle conversion unit 72, and the region information of the subject region of one frame ahead stored in the region information storage unit 153, and supplies the comparison result to the subject region determining unit 152.

More specifically, for example, the region information comparing unit 151 compares the size of a rectangular frame surrounding each rectangular region on the subject map from the subject candidate region to rectangle conversion unit 72, and the size of a rectangular frame (subject frame) surrounding the subject region of one frame ahead stored in the region information storage unit 153. Also, for example, the region information comparing unit 151 compares the coordinates of the center position of a rectangular frame surrounding each rectangular region on the subject map from the subject candidate region to rectangle conversion unit 72, and the coordinates of the center position of a rectangular frame (subject frame) surrounding the subject region of one frame ahead stored in the region information storage unit 153.

In step S72, the subject region determining unit 152 takes, based on the comparison result from the region information comparing unit 151, a rectangular region having the size or center position of a rectangular frame most approximate to the size or coordinates of center position of a rectangular frame (subject frame) surrounding the subject region of one frame ahead as a subject region. The subject region determining unit 152 supplies the coordinate information of the determined subject region to the control unit 35 and weight coefficient calculating unit 74, and also supplies the region information of the subject region (the size or center position of the subject frame) to the region information storage unit 153.

However, with the first subject region selection processing, the region information of a subject region of one frame ahead is not stored in the region information storage unit 153, and accordingly, a rectangular region including a predetermined region of the subject selected (hereafter, referred to as "initial selected region") by the user at the time of start of the subject tracking processing is taken as the subject region.

In this way, the subject region selecting unit 73 selects the subject region of a subject of interest out of rectangular regions serving as candidates of a subject.

[Calculation of Weight Coefficient]

Now, description will return to the flowchart in FIG. 6. In step S14, the weight coefficient calculating unit 74 calculates, based on the band feature amount map and synthesized feature amount map from the subject map generating unit 71, and the coordinate information representing the subject region from the subject region selecting unit 73, the weight coefficient groups $W_R$ and $W_C$ shown in FIG. 8.

Figure 12:
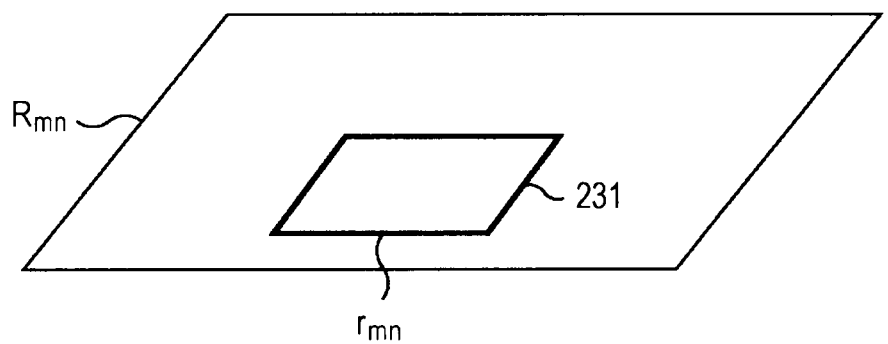
FIG. 12 is a diagram for describing sum of subject region feature amounts of a band feature amount map.
Figure 13:
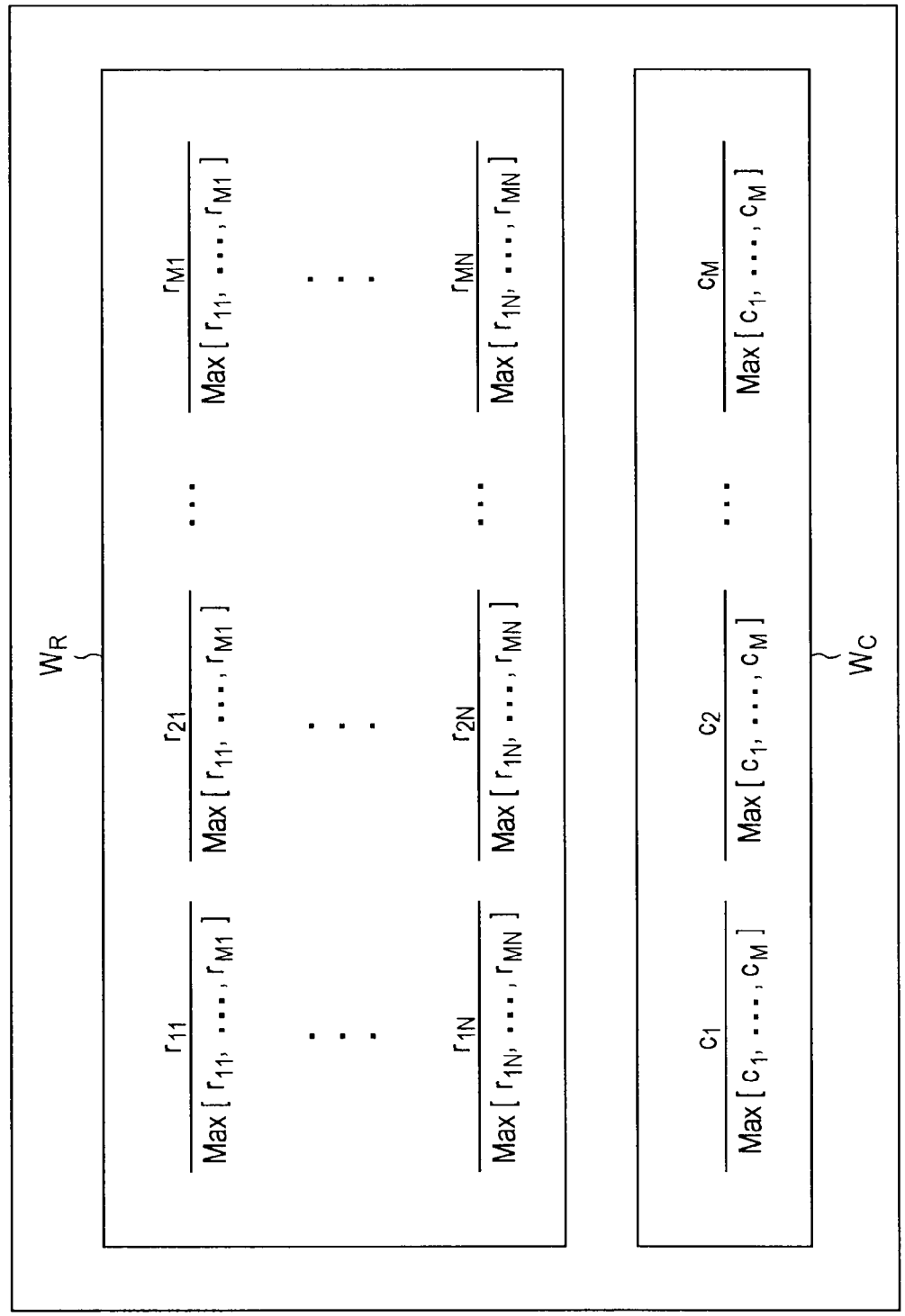
FIG. 13 is a diagram for describing a weight coefficient.

More specifically, as shown in FIG. 12, if we say that summation of feature amounts (information amounts) within a rectangular region corresponding to a subject frame 231 representing the subject region on a predetermined band feature amount map $R_{mn}$ ($1 \leq m \leq M$, $1 \leq n \leq N$) is subject region feature amount sum $r_{mn}$, a weight coefficient group $W_R$ such as shown in the upper side of FIG. 13 is calculated.

The coefficients in the weight coefficient group $W_R$ in FIG. 13 correspond to the weight coefficients $w_{11}$ through $W_{MN}$ in FIG. 8, respectively. Let us say that in FIG. 13 Max[a, ..., z] represents the maximum value of values a through z.

For example, the coefficients of the first row from the top of the weight coefficient group $W_R$ in FIG. 13 indicate the weight coefficients $w_{11}$ through $w_{M1}$ regarding the band feature amounts $R_{11}$ through $R_{M1}$ for each feature amount that are in "band 1" shown in FIG. 8. As shown in FIG. 13, with regard to the weight coefficients $w_{11}$ through $w_{M1}$, the denominators are the maximum values of the subject region feature amount sums $r_{11}$ through $r_{M1}$ regarding the band feature amount maps $R_{11}$ through $R_{M1}$ respectively, and the numerators are coefficients that are the subject region feature amount sums $r_{11}$ through $r_{M1}$ regarding the band feature amount maps $R_{11}$ through $R_{M1}$ respectively, and take a value of 0 through 1.

Similarly, the coefficients of the N'th row from the top of the weight coefficient group $W_R$ in FIG. 13 indicate the weight coefficients $w_{1N}$ through $w_{MN}$ regarding the band feature amount maps $R_{1N}$ through $R_{MN}$ for each feature amount that are in "band N" shown in FIG. 8. As shown in FIG. 13, with regard to the weight coefficients $w_{1N}$ through $w_{MN}$, the denominators are the maximum values of the subject region feature amount sums $r_{1N}$ through $r_{MN}$ regarding the band feature amount maps $R_{1N}$ through $R_{MN}$ respectively, and the numerators are coefficients that are the subject region feature amount sums $r_{1N}$ through $r_{MN}$ regarding the band feature amount maps $R_{1N}$ through $R_{MN}$ respectively, and take a value of 0 through 1.

That is to say, according to the weight coefficients $w_{1n}$ through $w_{mn}$, with the band feature amount maps $R_{1n}$ through $R_{mn}$ for each feature amount that are in "band n", the band feature amount map having the feature amount whereby the subject region feature amount sum is the maximum is weighted with the maximum value of 1, and other band feature amount maps are weighted according to the subject region feature amount sums.

Also, if we say that the sum of feature amounts (information amounts) within a rectangular region corresponding to the rectangular frame 221 representing the subject region on a predetermined synthesized feature amount map Cm ($1 \leq m \leq M$) is subject region feature amount sum $c_m$, a weight coefficient group $W_C$ such as shown in the lower side of FIG. 13 is calculated.

The coefficients in the weight coefficient group $W_C$ in FIG. 13 correspond to the weight coefficients $w_1$ through $w_M$ shown in FIG. 8, respectively.

That is to say, the coefficients in the weight coefficient group $W_C$ in FIG. 13 indicate the weight coefficients $w_1$ through $w_M$ regarding the synthesized feature amount maps $C_1$ through $C_M$ for each feature amount shown in FIG. 8. As shown in FIG. 13, with regard to the weight coefficients $w_1$ through $w_M$, the denominators are the maximum values of the subject region feature amount sums $c_1$ through $c_M$ regarding the synthesized feature amount maps $C_1$ through $C_M$ respectively, and the numerators are coefficients that are the subject region feature amount sums $c_1$ through $c_M$ regarding the synthesized feature amount maps $C_1$ through $C_M$ respectively, and take a value of 0 through 1.

That is to say, according to the weight coefficients $w_1$ through $w_M$, with the synthesized feature amount maps $C_1$ through $C_M$ for each feature amount, the synthesized feature amount map having the feature amount whereby the subject region feature amount sum is the maximum is weighted with the maximum value of 1, and other band feature amount maps are weighted according to the subject region feature amount sums.

The weight coefficient calculating unit 74 supplies the calculated weight coefficient $W_R$ to the band feature amount map synthesizing unit 113 of the subject map generating unit 71, and also supplies the weight coefficient group $W_C$ to the synthesized feature amount map synthesizing unit 114 of the subject map generating unit 71. With the flowchart in FIG. 6, after step S14, the subject tracking processing as to the next frame is executed, and this processing is repeated for each frame.

According to the above-mentioned processing, with the feature amount map for each feature amount regarding a predetermined frame of an input image, a weight coefficient as to the feature amount map for each feature amount regarding the next frame is determined according to the relative size of the feature amount of a region corresponding to the subject region selected in the frame thereof. Accordingly, even in the event that a feature amount fluctuates between frames, a subject map where, of multiple feature amounts, the feature amount map of the feature amount representing the subject in the most suitable manner is weighted with the highest value is generated, and accordingly, the subject can be tracked in a more stable manner even under an environment in which the state of the subject fluctuates.

Also, the subject region is determined so as to include the entire subject, and accordingly, the subject can be tracked in a more stable manner even under an environment in which the state of a partial region of the subject fluctuates.

In particular, with a conventional subject tracking technique, in the event that any coordinates within the subject region (or a partial region including the coordinates thereof) are identified, the entire subject cannot be tracked, and the detection frames of AF (Auto Focus), AE (Auto Exposure), and ACC (Auto Color Control) cannot be correctly set. Also, in the event that the same feature amount region where the feature amount is the same within the subject region is identified, precision for setting a detection frame can be improved as compared to the above case, but the same feature amount region is frequently only a part of the subject region, and sufficient detection precision has not been obtained.

On the other hand, according to the above-mentioned subject tracking processing, a subject region including the entire subject can be identified, detection precision can be improved, and consequently, tracking results may be applied to various applications.

Also, of conventional subject tracking techniques, for example, some techniques detect and track a person by registering the entire image of a person in a dictionary by learning, but cannot track a subject other than persons registered in the dictionary. Further, the amount of information (images) to be registered in the dictionary becomes a huge amount, and accordingly, the device scale increases.

On the other hand, according to the above-mentioned subject tracking processing, an optional subject can be detected and tracked, and further, there is no need to register a huge amount of information in the dictionary or the like, whereby the device scale can be downsized.

With the above description, a luminance component, color components, and edge directions have been employed as the feature amounts, but the feature amounts are not restricted to these, and motion information and so forth may be added, for example. Also, feature amounts to be employed are suitable if they have a complementary relation such as between a luminance component and a color component, for example, and may be selected as appropriate.

Also, with the above description, in response to the M×(N+1) types of feature amount maps, M×(N+1) types of weight coefficients have been calculated, but only a weight coefficient corresponding to a part of the feature amount maps is calculated as appropriated, whereby the calculation amount at the image processing device 11 can be suppressed. For example, only weight coefficients $w_1$ through $w_M$ corresponding to the M types of feature amount maps of the synthesized feature amount maps $C_1$ through $C_M$ may be calculated.

Further, with the above description, the region information calculating unit 134 has calculated the size and coordinates of the center position of a rectangular frame as the region information of a rectangular region, but the integral value or peak value (maximum value) of pixel values with a rectangular region may be calculated. In this case, with the subject region selection processing (FIG. 11), a rectangular region having the integral value or peak value of pixel values within a region most approximate to the integral value or peak value of pixel values within the subject region of one frame ahead is taken as the subject region.

Incidentally, with the image processing device 11, as an example of an application to which the tracking results of the above-mentioned subject tracking processing have been applied, imaging range adjustment processing for imaging a tracked subject while fixedly maintaining the size of the subject in the imaging range may be executed.

[Imaging Range Adjustment Processing]

Now, the imaging range adjustment processing of the image processing device 11 will be described with reference to the flowchart in FIG. 14. The imaging range adjustment processing is started, for example, when the operation mode of the image processing device 11 proceeds to an imaging mode for imaging a subject by the user interface 38 serving as a button being operated by the user, and a predetermined region of a subject serving as an imaging object is selected by the user on the input image (imaged image) displayed on the display unit 34.

In step S71, the subject tracking unit 55 executes the subject tracking processing described in the flowchart in FIG. 6 to supply the coordinate information of the subject region to the control unit 35.

In step S72, the control unit 35 controls, based on the coordinate information of the subject region from the subject tracking unit 55, the lens driving unit 36 to drive the zoom lens included in the optical system 31 and to execute automatic zoom adjustment processing.

The details of the automatic zoom adjustment processing by the control unit 35 will be described later, but according to the above processing, even if distance as to the subject changes, the size of the subject in the imaging range can be held constant.

[Functional Configuration Example of Control Unit]

Now, description will be made regarding a functional configuration example of the control unit 35 which executes the automatic zoom adjustment processing in step S72 of the flowchart in FIG. 14, with reference to FIG. 15.

The control unit 35 in FIG. 15 includes a coordinate information obtaining unit 311, a target size setting unit 312, an operation determining unit 313, a position detecting unit 314, a comparing unit 315, and a lens driving control unit 316.

The coordinate information obtaining unit 311 obtains the coordinate information of the subject region supplied for each frame of the input image from the subject tracking unit 55, and supplies to the target size setting unit 312, position detecting unit 314, and comparing unit 315. Also, upon obtaining the coordinate information from the subject tracking unit 55, the coordinate information obtaining unit 311 supplies information to the effect that the coordinate information has been obtained to the operation determining unit 313.

The target size setting unit 312 sets, based on the coordinate information of the subject region from the coordinate information obtaining unit 311, the size of the subject region represented with the coordinate information regarding a predetermined frame as the target size serving as a target for holding the size of the subject in the imaging range constant. Specifically, the control unit 35 controls the lens driving unit 36 to drive the zoom lens so as to constantly approximate the size of the subject region to the target size. The target size setting unit 312 supplies the target size that has been set to the comparing unit 315.

Upon information to the effect that the coordinate information has been obtained from the subject tracking unit 55 being supplied from the coordinate information obtaining unit 311, the operation determining unit 313 determines, based on the control signal from the user interface control unit 37, whether or not the zoom button (or zoom lever) serving as the user interface 38 has been operated. The operation determining unit 313 supplies information representing the determination result to the target size setting unit 312, position detecting unit 314, and lens driving control unit 316.

The position detecting unit 314 detects, based on the coordinate information of the subject region from the coordinate information obtaining unit 311, the position of the subject in the imaging range, and supplies information according to the position thereof to the comparing unit 315, lens driving control unit 316, and display unit 34 (FIG. 1).

Upon the information according to the position of the subject being supplied from the position detecting unit 314, the comparing unit 315 compares the size of the subject region represented with the coordinate information from the coordinate information obtaining unit 311, with the target size from the target size setting unit 312. The comparing unit 315 supplies information representing the comparison result to the lens driving control unit 316.

Based on the information representing the determination result from the operation determining unit 313, or the information representing the comparison result from the comparing unit 315, the lens driving control unit 316 controls the lens driving unit 36 to drive the zoom lens of the optical system 31 (FIG. 1).

[Automatic Zoom Adjustment Processing]

Next, description will be made regarding the automatic zoom adjustment processing by the control unit 35 in FIG. 15 corresponding to step S72 in the flowchart in FIG. 14, with reference to the flowchart in FIG. 16 and FIG. 17.

In step S111, the coordinate information obtaining unit 311 obtains the coordinate information of the subject region from the subject tracking unit 55, and supplies to the target size setting unit 312.

In step S112, the coordinate information obtaining unit 311 determines whether or not this operation is the initial operation, i.e., whether or not the coordinate information obtained in step S111 is the coordinate information of the subject region regarding the first frame after the imaging range adjustment processing (FIG. 14) is started.

In the event that determination is made in step S112 that this operation is the initial operation, the coordinate information obtaining unit 311 supplies information to the effect that the coordinate information regarding the first frame has been obtained since the imaging range adjustment processing was started, to the target size setting unit 312 and operation determining unit 313, and the processing proceeds to step S113.

In step S113, upon the coordinate information of the subject region regarding the first frame being supplied from the coordinate information obtaining unit 311, the target size setting unit 312 sets the size of the subject region that is a rectangular region represented with the coordinate information thereof as the target size. Specifically, the target size setting unit 312 sets the width Hw (or height Hh) of the subject region regarding the first frame as the target width Hw_target (or target height Hh_target). The target size setting unit 312 supplies the target size that has been set to the comparing unit 315, and the processing proceeds to step S114.

On the other hand, in the event that determination is made in step S112 that this operation is not the initial operation, i.e., in the event that the coordinate information obtained in step S111 is the coordinate information of the subject region regarding the second frame and thereafter since the imaging range adjustment processing (FIG. 14) was started, the coordinate information obtaining unit 311 supplies information to the effect that the coordinate information has been obtained to the operation determining unit 313, and the processing proceeds to step S114.

In step S114, upon the information to the effect that the coordinate information has been obtained from the subject tracking unit 55 being supplied from the coordinate information obtaining unit 311, the operation determining unit 313 determines, based on the control signal from the user interface control unit 37, whether or not a zoom operation by the user has been performed.

In the event that determination is made in step S114 that a zoom operation by the user has been performed, the operation determining unit 313 supplies the control signal representing the content of the zoom operation from the user interface control unit 37 to the lens driving control unit 316, and the processing proceeds to step S115.

In step S115, the operation determining unit 313 turns on a manual flag held in the inside. The manual flag is a flag representing whether or not a zoom operation has been performed by the user at the automatic zoom adjustment processing of the imaging range adjustment processing regarding the frame of one frame ahead while the imaging range adjustment processing is executed for each frame. Specifically, in the event that a zoom operation has been performed by the user at the automatic zoom adjustment processing regarding the frame of one frame ahead, the manual flag is ON, and in the event that a zoom operation has not been performed, the manual flag is OFF. Note that the manual flag is set to OFF immediately after the imaging range adjustment processing (automatic zoom adjustment processing) is started.

In step S116, in response to the zoom operation by the user (wide angle instruction or telephoto instruction) represented with the control signal from the operation determining unit 313, the lens driving control unit 316 controls the lens driving unit 36 to drive the zoom lens of the optical system 31 by distance d1. The distance d1 is distance whereby the zoom lens can be moved while the subject tracking processing for one frame worth is executed.

In this case, the user can adjust the imaging range (angle of view) in his/her preference regardless of whether or not the subject is tracked in the imaging range.

In the event that determination is made in step S114 that a zoom operation by the user has not been performed, in step S117 the operation determining unit 313 determines whether or not the manual flag held in the inside is ON.

In the event that determination is made in step S117 that the manual flag is ON, i.e., in the event that, with the automatic zoom adjustment processing regarding the frame of one frame ahead, a zoom operation by the user has been performed, the processing proceeds to step S118.

In step S118, the operation determining unit 313 turns off the manual flag held in the inside, and supplies information to the effect that the manual flag has been turned off to the target size setting unit 312 and position detecting unit 314.

In step S119, based on the information from the operation determining unit 313, and based on the size of the subject region represented with the coordinate information of the subject region regarding the frame at that time from the coordinate information obtaining unit 311, the target size setting unit 312 updates the target size, and supplies to the comparing unit 315.

That is to say, with the last frame, the size of the subject in the imaging range (angle of view) adjusted by the user, i.e., the size of the subject region is newly set as the target size.

On the other hand, in the event that determination is made in step S117 that the manual flag is not ON, i.e., in the event that, with the automatic zoom adjustment processing regarding the frame of one frame ahead, a zoom operation by the user has not been performed, the operation determining unit 313 supplies information to the effect that the manual flag is OFF to the position detecting unit 314.

Upon the information to the effect that the manual flag is OFF (or turned off) being supplied from the operation determining unit 313, in step S120 the position detecting unit 314 detects the position of the subject in the imaging range based on the coordinate information of the subject region from the coordinate information obtaining unit 311. The position detecting unit 314 then determines whether or not the subject is included in a region A in the imaging range shown in FIG. 18, based on the detected position.

Figure 18:
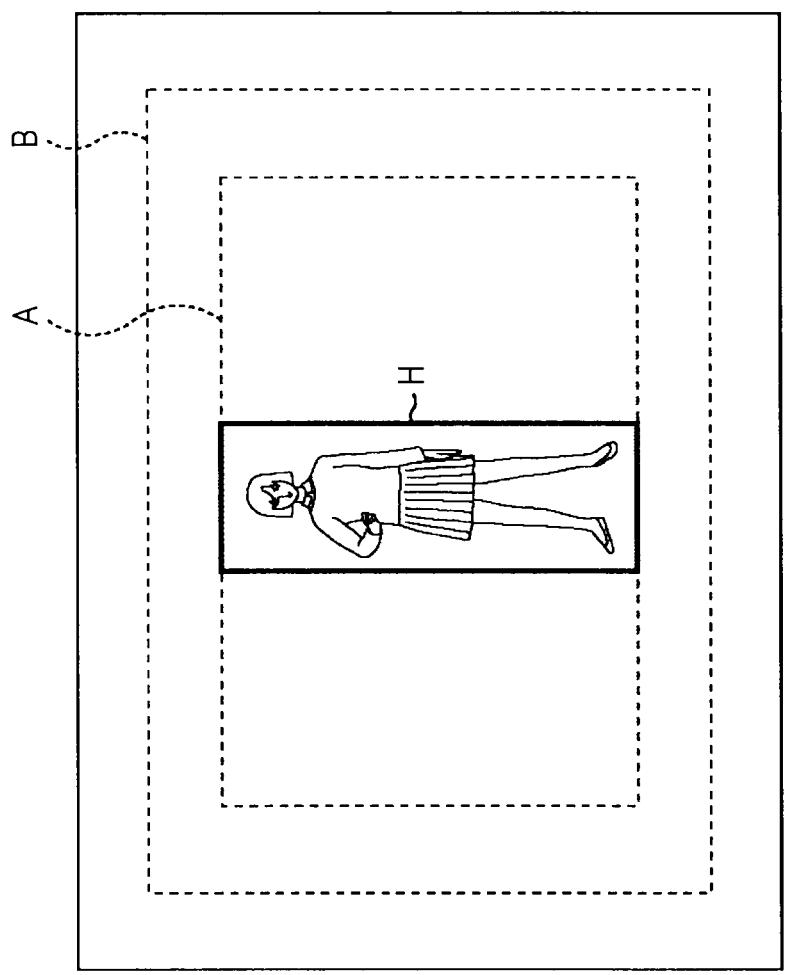
FIG. 18 is a diagram for describing an imaging range where a subject is imaged.

FIG. 18 is a diagram representing the imaging range where a subject is imaged, of an imaged image displayed on the display unit 34. In FIG. 18, the subject is surrounded with a subject frame H representing a subject region. Also, in FIG. 18, a region A and a region B are indicated with a dashed line. The region A is set so as to include the center portion of the imaging range, and is a region where it is desirable for the subject to be included in the inner side thereof at the time of imaging. Also, the region B is set to an outer edge region of the imaging range, and is a region where the subject may be out of the imaging range (out of frame) if the subject is in the outer side thereof at the time of imaging.

That is to say, in step S120, the position detecting unit 314 determines whether or not the subject is included in a region desirable for imaging in the imaging range. Specifically, the position detecting unit 314 determines whether or not the center coordinates (or the coordinates of one of the four apexes) of the subject frame H representing the subject region is included in the range A.

In the event that determination is made in step S120 that the subject is included in the region A, the position detecting unit 314 supplies information to the effect that the subject is included in the region A to the comparing unit 315, and the processing proceed to step S121.

Upon the information to the effect that the subject is included in the region A being supplied from the position detecting unit 314, in step S121 the comparing unit 315 compares the size of the subject region represented with the coordinate information from the coordinate information obtaining unit 311, and the target size from the target size setting unit 312.

Now, if we say that the size of the subject frame H shown in FIG. 18 is the target size, the comparing unit 315 compares the target width Hw_target (or target height Hh_target) of the subject frame H in FIG. 18 serving as the target size, and the width Hw (or height Hh) serving as the size of the subject region regarding the frame at that time.

The comparing unit 315 determines whether or not the size of the subject region is greater than the target size, and specifically determines whether or not the width Hw (or height Hh) of the subject region is greater than a value obtained by adding a predetermined value to the target width Hw_target (or target height Hh_target).

Figure 19:
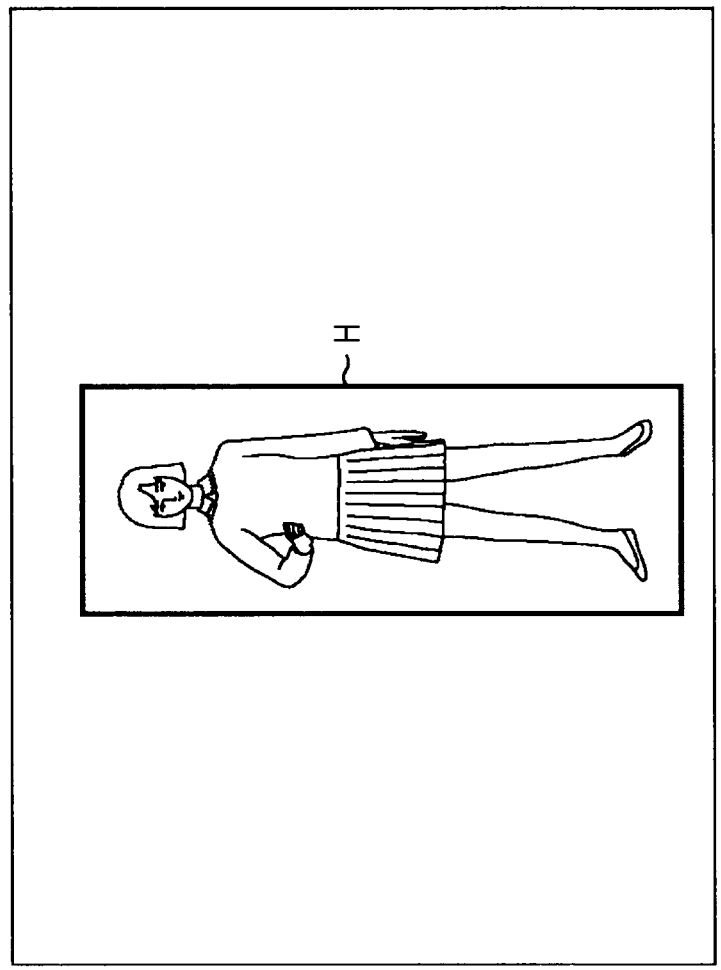
FIG. 19 is a diagram for describing an imaging range where a subject is imaged.

In the event that determination is made in step S121 that the size of the subject region is greater than the target size as shown in FIG. 19, the comparing unit 315 supplies information to the effect that the size of the subject region is greater than the target size to the lens driving control unit 316, and the processing proceeds to step S122.

In step S122, based on the information from the comparing unit 315, the lens driving control unit 316 controls the lens driving unit 36 to drive the zoom lens of the optical system 31 by the distance d1 toward the wide-angle side.

In this way, in the event that the size of the subject in the imaging range is greater than a size serving as a target, the subject is subjected to zoom out so that the size of the subject approximates to the size serving as a target.

On the other hand, in the event that determination is made in step S121 that the size of the subject region is not greater than the target size, the processing proceeds to step S123.

In step S123, the comparing unit 315 determines whether or not the size of the subject region is smaller than the target size, and specifically determines whether or not the width Hw (or height Hh) of the subject region is smaller than a value obtained by subtracting a predetermined value from the target width Hw_target (or target height Hh_target).

Figure 20:
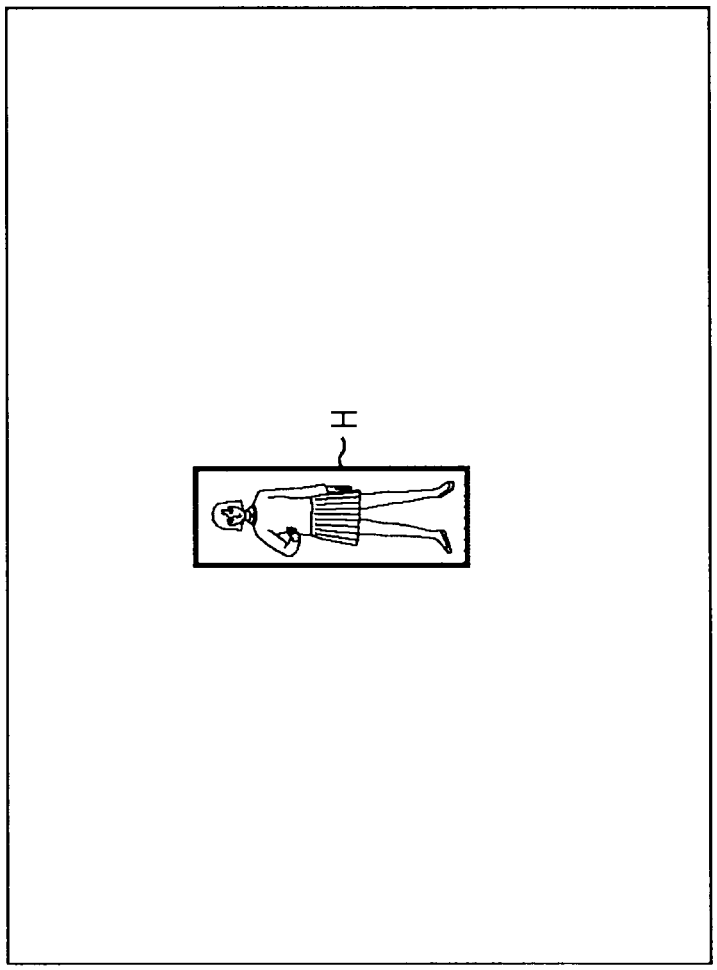
FIG. 20 is a diagram for describing an imaging range where a subject is imaged.

In the event that determination is made in step S123 that the size of the subject region is smaller than the target size as shown in FIG. 20, the comparing unit 315 supplies information to the effect that the size of the subject region is smaller than the target size to the lens driving control unit 316, and the processing proceeds to step S124.

In step S124, based on the information from the comparing unit 315, the lens driving control unit 316 controls the lens driving unit 36 to drive the zoom lens of the optical system 31 by the distance d1 toward the telephoto side.

In this way, in the event that the size of the subject in the imaging range is smaller than a size serving as a target, the subject is subjected to zoom in so that the size of the subject approximates to the size serving as a target.

On the other hand, in the event that determination is made in step S123 that the size of the subject region is not smaller than the target size, i.e., in the event that the size of the subject region is the same or generally the same as the target size, the comparing unit 315 does nothing, and accordingly, any information is not supplied to the lens driving control unit 316.

In this way, in the event that the size of the subject in the imaging range is the same or generally the same as a size serving as a target, neither zoom out nor zoom in are performed.

Incidentally, in the event that determination is made in step S120 that the subject is not included in the region A, the processing proceeds to step S125, where the position detecting unit 314 determines whether or not the subject is included in the region B. Specifically, the position detecting unit 314 determines whether or not the center coordinates of the subject frame H (or all of the coordinates of the four apexes) representing the subject region are included in the region B.

In the event that determination is made in step S125 that the subject is included in the region B, the position detecting unit 314 does nothing, and accordingly, any information is not supplied to the lens driving control unit 316.

In this way, in the event that in the imaging range, the subject is in the outer side of the region A and also in the inner side of the region B, neither zoom out nor zoom in are performed.

On the other hand, in the event that determination is made in step S125 that the subject is not included in the region B, the position detecting unit 314 supplies information to the effect that the subject is not included in the region B to the lens driving control unit 316, and the processing proceeds to step S126.

In step S126, based on the information from the position detecting unit 314, the lens driving control unit 316 controls the lens driving unit 36 to drive the zoom lens of the optical system 31 toward the wide-angle side by distance d2. The distance d2 is distance greater than the distance d1, and is distance whereby the zoom lens can be moved while the subject tracking processing for one frame worth is executed.

Thus, even when the subject approximates to an edge of the imaging range (angle of view), zoom out can rapidly be performed so as to prevent the subject from being out of frame.

In step S127, the lens driving control unit 316 determines whether or not the lens position of the zoom lens is the wide-angle end as a result of the lens driving unit 36 driving the zoom lens toward the wide-angle side by the distance d2.

In the event that determination is made in step S127 that the lens position of the zoom lens is not the wide-angle end, the lens driving control unit 316 does nothing.

On the other hand, in the event that determination is made in step S127 that the lens position of the zoom lens is the wide-angle end, the lens driving control unit 316 supplies information to the effect that the lens position of the zoom lens is the wide-angle end to the position detecting unit 314, and the processing proceeds to step S128.

In step S128, upon the information from the lens driving control unit 316 being supplied, the position detecting unit 314 determines whether or not the subject is included in the imaging range. Specifically, the position detecting unit 314 determines whether or not the center coordinates (or the coordinates of one of the four apexes) of the subject frame H representing the subject region is included in the imaging range, and is in the outer side of the region B.

In the event that determination is made in step S128 that the subject is included in the imaging range, the position detecting unit 314 supplies information for presenting a warning to the effect that the subject is likely out of frame to the display unit 34, and the processing proceeds to step S129.

In step S129, the display unit 34 presents (displays) a warning to the effect that the subject is likely out of frame, based on the information from the position detecting unit 314.

Figure 21:
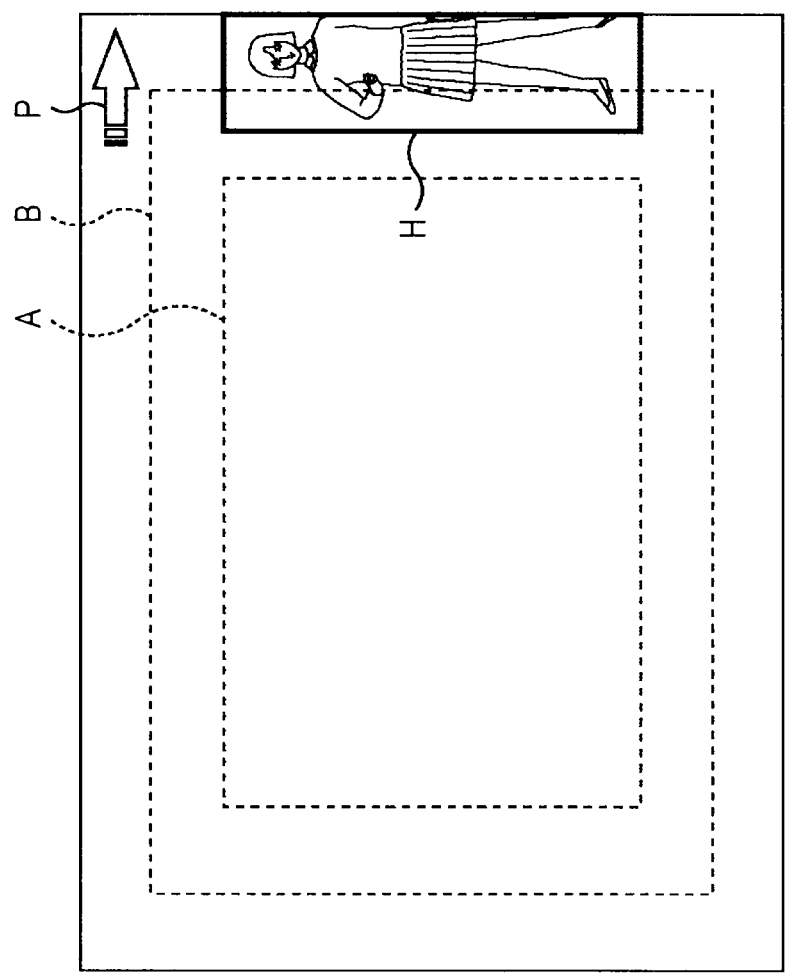
FIG. 21 is a diagram for describing an imaging range where a subject is imaged.

For example, as shown in FIG. 21, with an imaged image (imaging range) where the center coordinates of the subject frame H representing the subject region is displayed on the display unit 34, in the event that the subject is likely out of frame in the right side of the region B, the display unit 34 displays an arrow P prompting the user to move the imaging range to the right side as shown in the upper right of FIG. 21.

Thus, the user can confirm the warning to the effect that the subject is likely out of frame, and pan the image processing device 11 itself so as to prevent the subject from being out of frame.

On the other hand, in the event that determination is made in step S128 that the subject is not included in the imaging range, i.e., in the event that the subject is out of frame, the position detecting unit 314 supplies information for presenting a warning to the effect that the subject is out of frame to the display unit 34, and the processing proceeds to step S130.

In step S130, the display unit 34 presents (displays) the warning to the effect that the subject is out of frame, based on the information from the position detecting unit 314.

For example, with an imaged image (imaging range) where the center coordinates of the subject frame H representing the subject region is displayed on the display unit 34, in the event that the subject has completely been out of frame in the right side of the region B, the display unit 34 displays the arrow P shown in the upper right of FIG. 21 in a more emphasized manner.

Thus, the user can confirm the warning to the effect that the subject is out of frame, and pan the image processing device 11 itself so as to have the subject in the frame.

According to the above processing, in the event that the size of the subject region is greater than the target size, the zoom lens can be driven in the wide-angle side so as to perform zooming out, and in the event that the size of the subject region is smaller than the target size, the zoom lens can be driven in the telephoto side so as to perform zooming in. Accordingly, even in the event that the distance as to the subject changes at the time of imaging, the size of the subject in the imaging range may be held generally constant without performing a delicate zoom operation.

Also, in the event that a zoom operation has been performed by the user, the user's operation has a priority, and accordingly, the user may also adjust the imaging range in a user's favorite manner. After the zoom operation by the user is completed, the size of the subject region at that time is updated as the target size, whereby the target size can be set to a user's favorite size.

Note that, with the above-mentioned processing, the size of the subject region at the time of the initial operation has been set as the target size, but the target size may be determined beforehand by the user's operations or the like, for example.

Also, with the above-mentioned processing, a warning to the effect that the subject is likely out of frame (or has been out of frame) has been displayed on the display unit 34, but instead of this, audio may be output from the speaker serving as the user interface 38, or an arrangement may be made wherein a vibrating portion made up of a motor to which eccentric weight is attached is provided, and the vibrating portion thereof is vibrated.

Further, with the above-mentioned processing, a person serving as the subject has been tracked, and the size of the person thereof has been held generally constant in the imaging range, but the subject is not restricted to persons. Also, in the event that the subject is a person, a face detecting device for detecting the face of a person is provided, whereby the size of the face in the imaging range can be held generally constant.

With the above description, the automatic zoom adjustment processing has been described wherein even in the event that the distance as to the subject changes at the time of imaging, the size of the subject in the imaging range is held generally constant. However, with the configuration of the image processing device 11, in the event that the distance as to the subject is constant, the size of the subject in the imaging range cannot be changed to a desired size. Specifically, in the event that the subject is a person, examples of the size (what we might call shot) of a person in the imaging range include a full shot wherein a full-length portrait is imaged, a bust shot wherein the upper body is imaged, and a close-up shot wherein a face is imaged, but the imaging range cannot be adjusted so as to obtain such a shot.

Therefore, description will be made hereafter regarding a configuration wherein the imaging range is adjusted so that the size of a subject in the imaging range becomes a desired size.

[Another Configuration Example of Image Processing Device]

Figure 22:
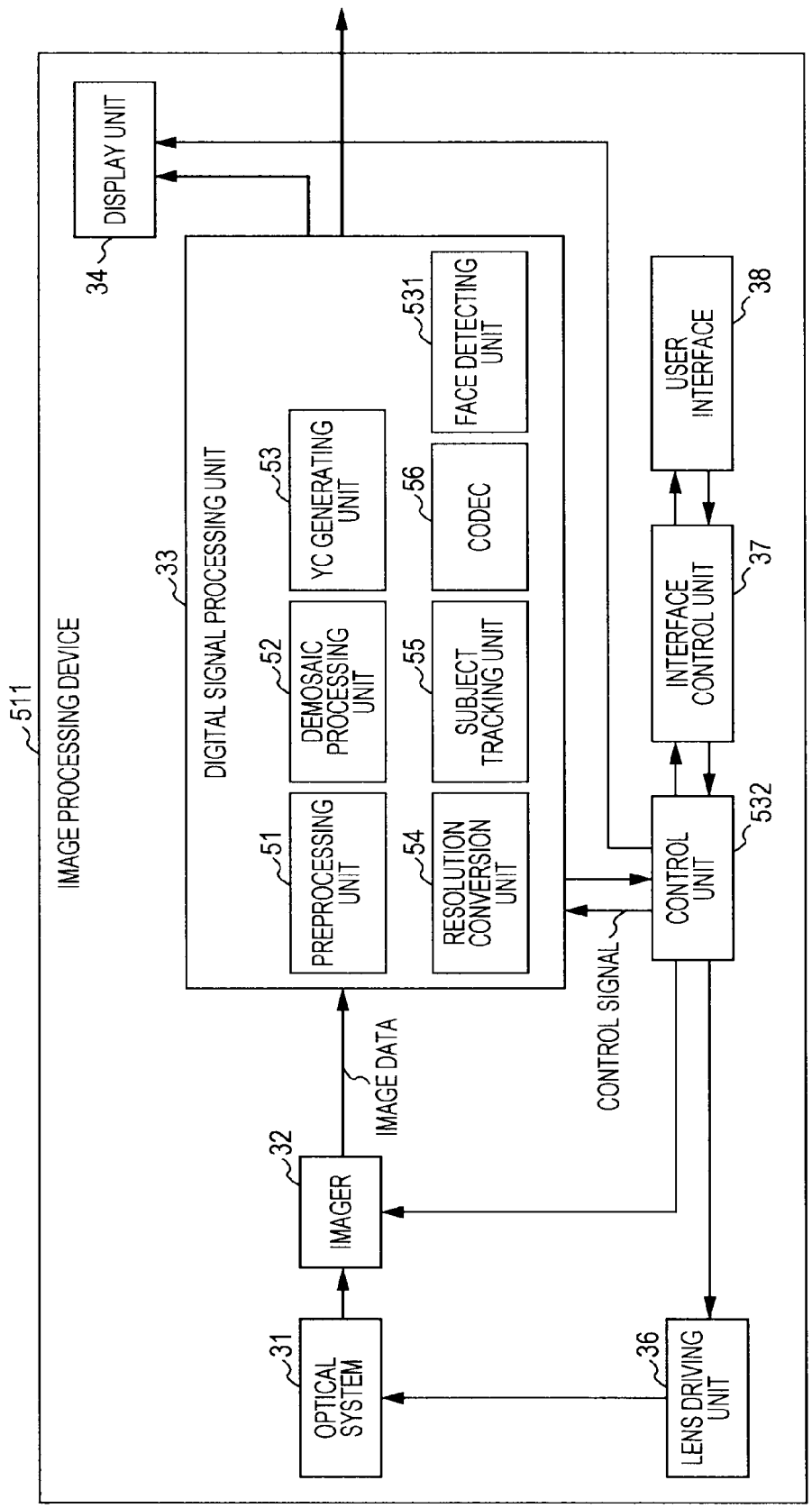
FIG. 22 is a block diagram illustrating another configuration example of the image processing device.

FIG. 22 illustrates a configuration example of an image processing device wherein the imaging range is adjusted so that the size of a subject in the imaging range becomes a desired size.

Note that, with the image processing device 511 in FIG. 22, configurations having the same function as provided to the image processing device 11 in FIG. 1 will be denoted with the same names and same reference numerals, and description thereof will be omitted as appropriate.

Specifically, the image processing device 511 in FIG. 22 differs from the image processing device 11 in FIG. 1 in that, with the digital signal processing unit 33, a face detecting unit 531 is newly provided, and a control unit 532 is provided instead of the control unit 35.

Based on the image data made up of the luminance signal and color signals generated by the YC generating unit 53, with the input image displayed by the image data, the face detecting unit 531 detects a face from the subject region of a person serving as the subject detected by the subject tracking unit 55, and supplies coordinate information representing the region of the face (hereafter, referred to as "face region") to the control unit 532.

The control unit 532 controls the lens driving unit 36 based on the subject region from the subject tracking unit 55, and the coordinate information of the face region, thereby controlling the lens driving unit 36 to drive the zoom lens included in the optical system 31.

[Functional Configuration Example of Control Unit]

Now, a functional configuration example of the control unit 532 in FIG. 22 will be described with reference to FIG. 23.

Figure 23:
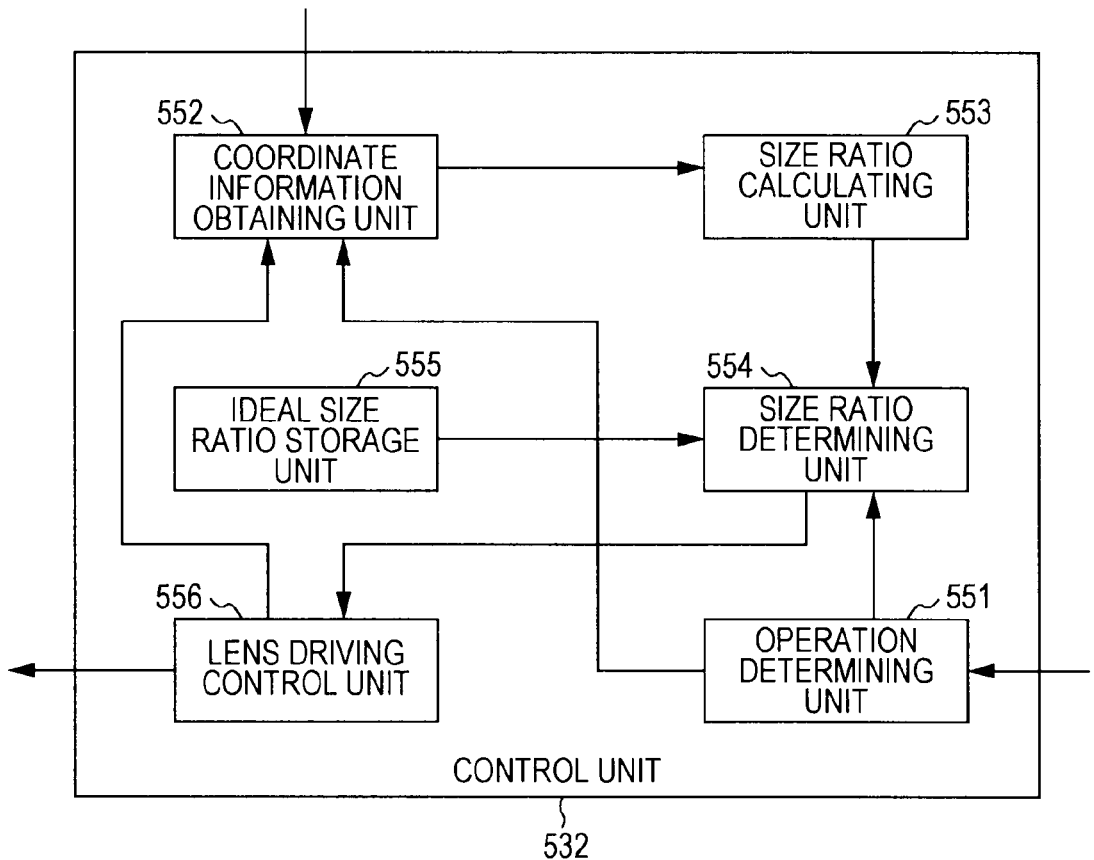
FIG. 23 is a block diagram illustrating a functional configuration example of the control unit in FIG. 22.

The control unit 35 in FIG. 23 includes an operation determining unit 551, a coordinate information obtaining unit 552, a size ratio calculating unit 553, a size ratio determining unit 554, an ideal size ratio storage unit 555, and a lens driving control unit 556.

Based on the control signal from the user interface control unit 37, the operation control unit 551 determines whether or not the zoom button (or zoom lever) serving as the user interface 38 has been operated. The operation determining unit 551 supplies information representing the determination result to the coordinate information obtaining unit 552 and size ratio determining unit 554.

In response to the information from the operation determining unit 551 or lens driving control unit 556, the coordinate information obtaining unit 552 obtains the subject region, and the coordinate information of the face region supplied from the subject tracking unit 55 and face detecting unit 531 for each frame, and supplies to the size ratio calculating unit 553.

The size ratio calculating unit 553 calculates a ratio between the size of the subject region, and the size of the face region (hereafter, referred to as "size ratio") based on the subject region, and the coordinate information of the face region from the coordinate information obtaining unit 552, and supplies to the size ratio determining unit 554.

The size ratio determining unit 554 compares the size ratio from the size ratio calculating unit 553, and an ideal size ratio stored in the ideal size ratio storage unit 555, and supplies information representing the comparison result to the lens driving control unit 556.

The ideal size ratio storage unit 555 stores the ideal size ratio that is an ideal ratio between the size of the subject region, and the size of the face region. The ideal size ration is a ratio between the size of the subject region, and the size of the face region so as to obtain a suitable shot such as a full shot, a bust shot, and a close-up shot from a person serving as a subject to be imaged, and is optionally set by the user. The ideal size ratio stored in the ideal size ratio storage unit 555 is read out by the size ratio determining unit 554 as appropriate.

Based on the information representing the comparison result from the size ratio determining unit 554, the lens driving control unit 556 controls the lens driving unit 36 to drive the zoom lens of the optical system 31 (FIG. 22). Also, the lens driving control unit 556 supplies information to the effect that the zoom lens has been driven to the coordinate information obtaining unit 552.

[Face Detection Processing]

Figure 24:
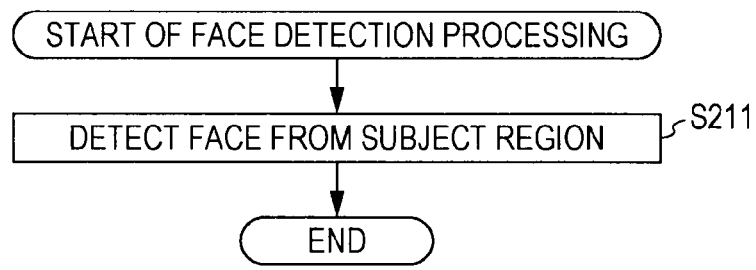
FIG. 24 is a flowchart for describing face detection processing.

Now, the face detection processing by the image processing device 511 in FIG. 22 will be described with reference to the flowchart in FIG. 24. The face detection processing is executed after the subject tracking processing by the subject tracking unit 55 that is executed for each frame.

Based on the image data made up of the luminance signal and color signals generated by the YC generating unit 53, with the input image displayed by the image data, the face detecting unit 531 detects a face from the subject region of a person serving as a subject detected by the subject tracking processing by the subject tracking unit 55, and supplies coordinate information representing the face region to the control unit 532.

In this way, with the imaging range, the face of a person that is tracked as a subject of interest may be detected.

[Specified Zoom Processing]

Next, the specified zoom processing by the control unit 532 in FIG. 23 will be described with reference to the flowcharts in FIG. 25 and FIG. 26.

In step S311, based on the control signal from the user interface control unit 37, the operation determining unit 551 determines whether or not a zoom operation by the user has been performed.

In the event that determination is made in step S311 that the processing has been repeated until a zoom operation is performed by the user, and a zoom operation has been performed, the operation determining unit 551 supplies information to the effect that a zoom operation has been performed to the coordinate information obtaining unit 552, and also supplies a control signal representing the content of the zoom operation from the user interface control unit 37 to the size ratio determining unit 554, and the processing proceeds to step S312.

In step S312, upon the information to the effect that a zoom operation has been performed by the user being supplied from the operation determining unit 551, the coordinate information obtaining unit 552 obtains, regarding a predetermined frame, the coordinate information of the subject region from the subject tracking unit 55, and the coordinate information of the face region from the face detecting unit 531, and supplies to the size ratio calculating unit 553.

In step S313, the size ratio calculating unit 553 calculates a size ratio between the size of the subject region, and the size of the face region based on the coordinate information of the subject region and face region from the coordinate information obtaining unit 552.

Specifically, the size ratio calculating unit 553 calculates a ratio Fh/Hh (or Fw/Hw) between the height Hh (or width Hw) of the subject region, and the height Fh (or width Fw) of the face region, as a size ratio. The size ratio calculating unit 553 supplies the calculated size ratio to the size ratio determining unit 554, and the processing proceeds to step S314.

In step S314, upon the size ratio being supplied from the size ratio calculating unit 553, the size ratio determining unit 554 determines, based on the control signal from the user interface control unit 37 being supplied from the operation determining unit 551, whether or not the zoom operation by the user is a zoom operation on the telephoto side.

In the event that determination is made in step S314 that the zoom operation by the user is a zoom operation on the telephoto side, the processing proceeds to step S315.

In step S315, the size ratio determining unit 554 determines whether or not the size ratio from the size ratio calculating unit 553 is smaller than the ideal size ratio to obtain a full shot.

Now, the ideal size ratio will be described with reference to FIG. 27.

Figure 27:
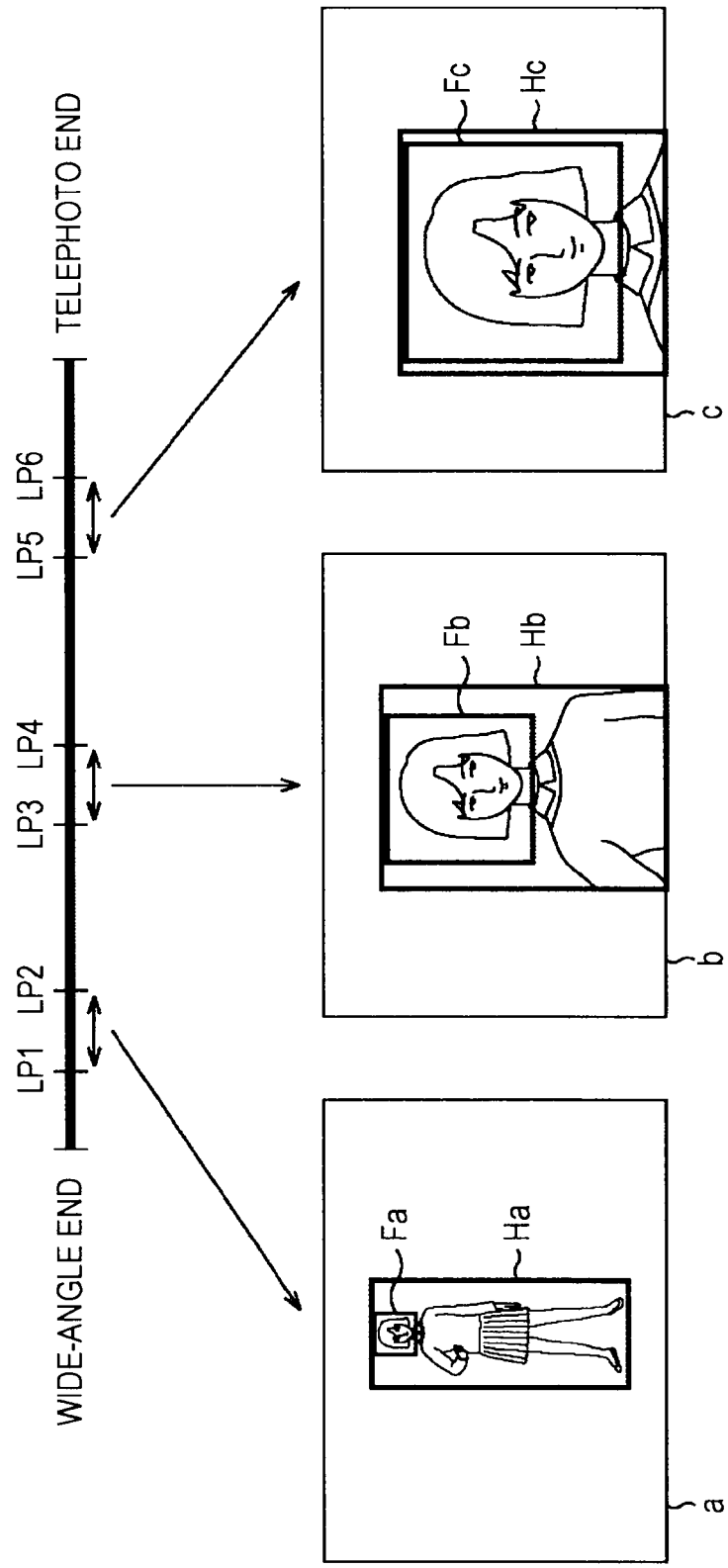
FIG. 27 is a diagram for describing ideal size ratios.

FIG. 27 schematically illustrates a relation between the driving range of the zoom lens, and the size of a subject in an input image.

The driving range of the zoom lens is shown on the upper side of FIG. 27, wherein the wide-angle end is shown on the left edge, and the telephoto end is shown on the right edge in the drawing. Also, lens positions LP1 through LP6 are shown between the wide-angle end and the telephoto end.

Also, images a through c where a person serving as a subject has been imaged are shown on the lower side of FIG. 27. With the images a through c, the subject has been imaged so as to obtain a full shot, a bust shot, and a close-up shot, respectively.

Now, if we say that the height of a subject region Ha of the subject whose the full-length portrait has been imaged in the image a is Hah, and the height of a face region Fa is Fah, the ideal size ratio to obtain a full shot is represented with Fah/Hah. FIG. 27 illustrates that this ideal size ratio Fah/Hah is obtained when the lens position of the zoom lens is between positions LP1 through Lp2 in the driving range of the zoom lens.

Also, if we say that the height of a subject region Hb of the subject whose the upper body has been imaged in the image b is Hbh, and the height of a face region Fb is Fbh, the ideal size ratio to obtain a bust shot is represented with Fbh/Hbh. FIG. 27 illustrates that this ideal size ratio Fbh/Hbh is obtained when the lens position of the zoom lens is between positions LP3 through Lp4 in the driving range of the zoom lens.

Further, if we say that the height of a subject region Hc of the subject whose the face has principally been imaged in the image c is Hch, and the height of a face region Fc is Fch, the ideal size ratio to obtain a close-up shot is represented with Fch/Hch. FIG. 27 illustrates that this ideal size ratio Fch/Hch is obtained when the lens position of the zoom lens is between positions LP5 through Lp6 in the driving range of the zoom lens.

Figure 25:
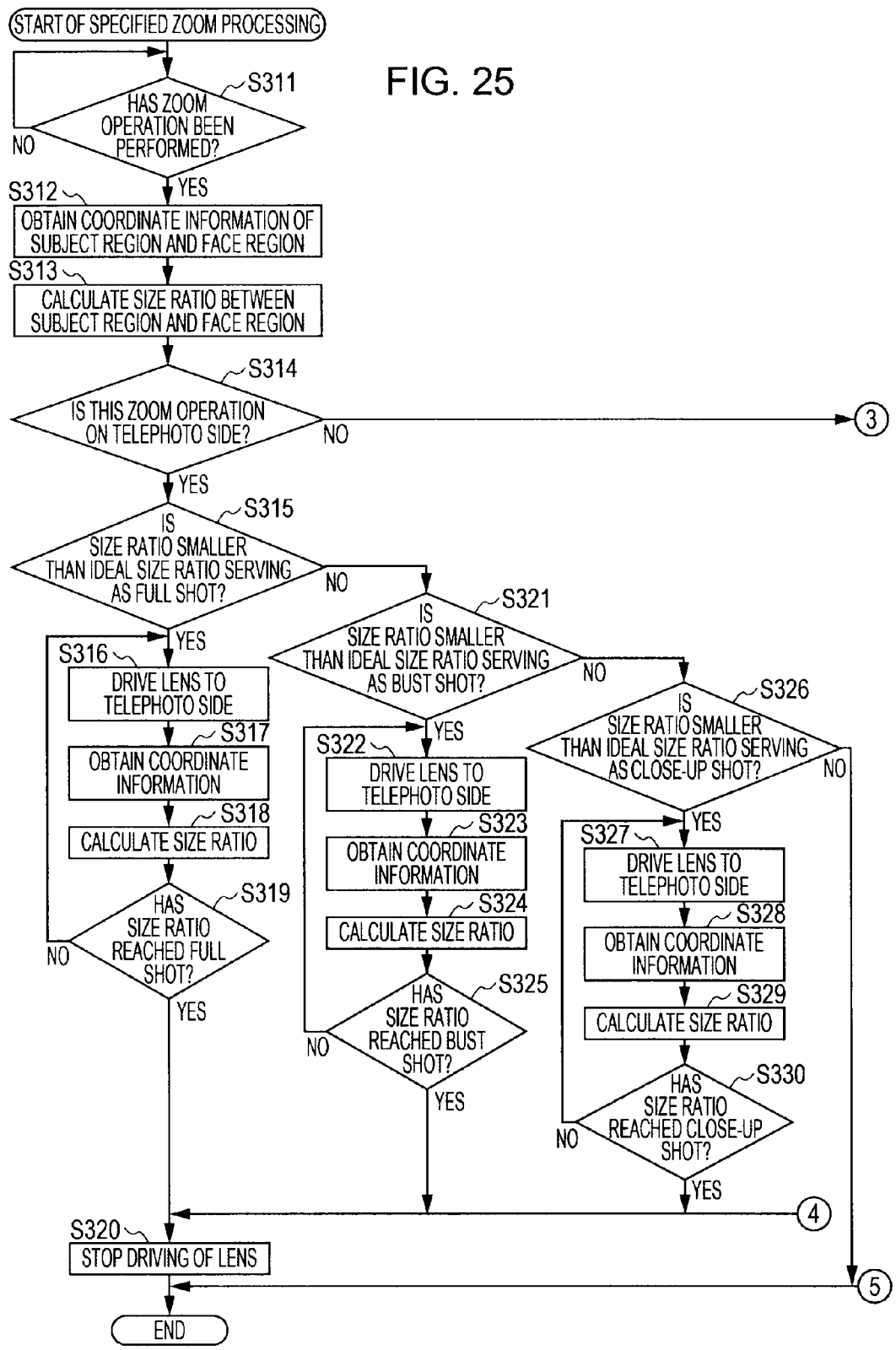
FIG. 25 is a flowchart for describing specified zoom processing.

That is to say, in step S315 of the flowchart in FIG. 25, determination is made whether or not the size ratio Fh/Hh from the size ratio calculating unit 553 is smaller than the ideal size ratio Fah/Hah to obtain a full shot.

Note that, in the event that the full-length portrait has been imaged, for example, even if the subject has been imaged far away, even if the subject has been imaged near, the size ratios of both are almost the same. Specifically, even when the subject was imaged in more distant in the image a in FIG. 27, the size ratio is generally the same as Fah/Hah.

Therefore, in step S315, determination is made whether or not the size ratio Fh/Hh from the size ratio calculating unit 533 is smaller than the ideal size ratio Fah/Hah to obtain a full shot, and also the height Hh of the subject region is greater than a predetermined threshold. Here, it goes without saying that the predetermined threshold is a value smaller than the height of the imaged image (imaging range), and a value whereby around one face region can be disposed in the top and bottom of the subject region in the imaging range may be employed, for example.

In the event that determination is made in step S315 that the size ratio is smaller than the ideal size ratio to obtain a full shot, the lens position of the zoom lens is between the wide-angle end and the lens position LP1 in the driving range of the zoom lens in FIG. 27, and accordingly, the size ratio determining unit 554 supplies information for instructing to drive the zoom lens to the telephoto side to the lens driving control unit 556, and the processing proceeds to step S316.

In step S316, based on the information from the size ratio determining unit 554, the lens driving control unit 556 controls the lens driving unit 36 to drive the zoom lens of the optical system 31 to the telephoto side by the distance d1. The distance d1 is taken as distance whereby the lens driving unit 36 can move the zoom lens while one frame worth of the subject tracking processing is executed, as described above. The lens driving control unit 556 supplies information to the effect that the zoom lens has been driven to the coordinate information obtaining unit 552.

In step S317, upon the information to the effect that the zoom lens has been driven being supplied from the lens driving control unit 556, the coordinate information obtaining unit 552 obtains the coordinate information of the subject region from the subject tracking unit 55, and the coordinate information of the face region from the face detecting unit 531 regarding the next frame, and supplies to the size ratio calculating unit 553.

In step S318, the size ratio calculating unit 553 calculates a size ratio Fh/Hh between the size of the subject region, and the size of the face region based on the coordinate information of the subject region and face region from the coordinate information obtaining unit 552. The size ratio calculating unit 553 supplies the calculated size ratio to the size ratio determining unit 554, and the processing proceeds to step S319.

In step S319, the size ratio determining unit 554 determines whether or not the subject is situated for a full shot, and specifically, whether or not the size ratio Fh/Hh from the size ratio calculating unit 553 is the same or generally the same as the ideal size ratio Fah/Hah to obtain a full shot, and also the height Hh of the subject region is greater than a predetermined threshold.

In the event that determination is made in step S319 that the subject is not situated for a full shot, the lens position of the zoom lens is still between the wide-angle end and the lens position LP1 in the driving range of the zoom lens in FIG. 27, and accordingly, the size ratio determining unit 554 supplies information for instructing to drive the zoom lens to the telephoto side to the lens driving control unit 556, and the processing returns to step S316. Hereafter, the processing in steps S316 through S319 is repeated for each frame.

In the event that determination is made in step S319 that the subject is situated for a full shot, the lens position of the zoom lens has become between the lens positions LP1 through LP2 in the driving range of the zoom lens in FIG. 27, and accordingly, the size ratio determining unit 554 supplies information for instructing to stop driving of the zoom lens to the lens driving control unit 556, and the processing proceeds to step S320.

In step S320, based on the information from the size ratio determining unit 554, the lens driving control unit 556 controls the lens driving unit 36 to stop driving of the zoom lens of the optical system 31.

Thus, even in the event of imaging a subject positioned far away from the user, the user can image the subject with a suitable full shot by simply performing a zoom operation on the telephoto side.

On the other hand, in the event that determination is made in step S315 that the size ratio is not smaller than the ideal size ratio to obtain a full shot, the processing proceeds to step S321, the size ratio determining unit 554 determines whether or not the size ratio is smaller than the ideal size ratio to obtain a bust shot. Specifically, determination is made whether or not the size ratio Fh/Hh from the size ratio calculating unit 553 is smaller than the ideal size ratio Fbh/Hbh to obtain a bust shot.

In the event that determination is made in step S321 that the size ratio is smaller than the ideal size ratio to obtain a bust shot, the lens position of the zoom lens has become between the lens positions LP1 through LP3 in the driving range of the zoom lens in FIG. 27, and accordingly, the size ratio determining unit 554 supplies information for instructing to drive the zoom lens to the telephoto side to the lens driving control unit 556, and the processing proceeds to step S322.

The processing in steps S322 through S324 is performed in the same way as the above-mentioned processing in steps S316 through S318, and accordingly, description thereof will be omitted.

In step S325, the size ratio determining unit 554 determines whether or not the subject is situated for a bust shot, and specifically, whether or not the size ratio Fh/Hh from the size ratio calculating unit 553 is the same or generally the same as the ideal size ratio Fbh/Hbh to obtain a bust shot.

In the event that determination is made in step S325 that the subject is not situated for a bust shot, the lens position of the zoom lens is still between the lens positions LP1 through LP3 in the driving range of the zoom lens in FIG. 27, and accordingly, the size ratio determining unit 554 supplies information for instructing to drive the zoom lens to the telephoto side to the lens driving control unit 556, and the processing returns to step S322. Hereafter, the processing in steps S322 through S325 is repeated for each frame.

In the event that determination is made in step S325 that the subject is situated for a bust shot, the lens position of the zoom lens has become between the lens positions LP3 through LP4 in the driving range of the zoom lens in FIG. 27, and accordingly, the size ratio determining unit 554 supplies information for instructing to stop driving of the zoom lens to the lens driving control unit 556, and the processing proceeds to step S320. In step S320, driving of the zoom lens stops as described above.

Thus, even in the event of a subject being imaged with a full shot, the user can image the subject with a suitable bust shot by simply performing a zoom operation on the telephoto side.

On the other hand, in the event that determination is made in step S321 that the size ratio is not smaller than the ideal size ratio to obtain a bust shot, the processing proceeds to step S326, the size ratio determining unit 554 determines whether or not the size ratio is smaller than the ideal size ratio to obtain a close-up shot. Specifically, determination is made whether or not the size ratio Fh/Hh from the size ratio calculating unit 553 is smaller than the ideal size ratio Fch/Hch to obtain a close-up shot.

In the event that determination is made in step S326 that the size ratio is smaller than the ideal size ratio to obtain a close-up shot, the lens position of the zoom lens is between the lens positions LP3 through LP5 in the driving range of the zoom lens in FIG. 27, and accordingly, the size ratio determining unit 554 supplies information for instructing to drive the zoom lens to the telephoto side to the lens driving control unit 556, and the processing proceeds to step S327.

The processing in steps S327 through S329 is performed in the same way as the above-mentioned processing in steps S316 through S318 and steps S322 through S324, and accordingly, description thereof will be omitted.

In step S330, the size ratio determining unit 554 determines whether or not the subject is situated for a close-up shot, and specifically, whether or not the size ratio Fh/Hh from the size ratio calculating unit 553 is the same or generally the same as the ideal size ratio Fch/Hch to obtain a close-up shot.

In the event that determination is made in step S330 that the subject is not situated for a close-up shot, the lens position of the zoom lens is still between the lens positions LP3 through LP5 in the driving range of the zoom lens in FIG. 27, and accordingly, the size ratio determining unit 554 supplies information for instructing to drive the zoom lens to the telephoto side to the lens driving control unit 556, and the processing returns to step S327. Hereafter, the processing in steps S327 through S329 is repeated for each frame.

In the event that determination is made in step S330 that the subject is situated for a close-up shot, the lens position of the zoom lens has become between the lens positions LP5 through LP6 in the driving range of the zoom lens in FIG. 27, and accordingly, the size ratio determining unit 554 supplies information for instructing to stop driving of the zoom lens to the lens driving control unit 556, and the processing proceeds to step S320. In step S320, driving of the zoom lens stops as described above.

Thus, even in the event of a subject being imaged with a bust shot, the user can image the subject with a suitable close-up shot by simply performing a zoom operation on the telephoto side.

On the other hand, in the event that determination is made in step S326 that the size ratio is not smaller than the ideal size ration to obtain a close-up shot, i.e., in the event that the lens position of the zoom lens is in the telephoto side than the lens position LP6 in the driving range of the zoom lens in FIG. 27, any processing is not performed. In this case, the subject is being imaged with a close-up shot or a closer shot than this, and accordingly, even in the event that a zoom operation on the telephoto side is performed, there is no need to perform zooming in more than this.

Incidentally, in the event that determination is made in step S314 that a zoom operation by the user is not a zoom operation on the telephoto side, i.e., in the event that determination is made that a zoom operation by the user is a zoom operation on the wide-angle side, the processing proceeds to step S331.

In step S331, the size ratio determining unit 554 determines whether or not the size ratio from the size ratio calculating unit 553 is greater than the ideal size ratio to obtain a close-up shot. Specifically, determination is made whether or not the size ratio Fh/Hh from the size ration calculating unit 553 is greater than the ideal size ratio Fch/Hch to obtain a close-up shot.

In the event that determination is made in step S331 that the size ratio is greater than the ideal size ratio to obtain a close-up shot, the lens position of the zoom lens is between the telephoto end and the lens position LP6 in the driving range of the zoom lens in FIG. 27, and accordingly, the size ratio determining unit 554 supplies information for instructing to drive the zoom lens to the wide-angle side to the lens driving control unit 556, and the processing proceeds to step S332.

In step S332, based on the information from the size ratio determining unit 554, the lens driving control unit 556 controls the lens driving unit 36 to drive the zoom lens of the optical system 31 to the wide-angle side by the distance d1. The lens driving control unit 556 supplies information to the effect that the zoom lens has been driven to the coordinate information obtaining unit 552.

In step S333, upon the information to the effect that the zoom lens has been driven being supplied from the lens driving control unit 556, the coordinate information obtaining unit 552 obtains the coordinate information of the subject region from the subject tracking unit 55, and the coordinate information of the face region from the face detecting unit 531 regarding the next frame, and supplies to the size ratio calculating unit 553.

In step S334, the size ratio calculating unit 553 calculates a size ratio Fh/Hh between the size of the subject region, and the size of the face region based on the coordinate information of the subject region and face region from the coordinate information obtaining unit 552. The size ratio calculating unit 553 supplies the calculated size ratio to the size ratio determining unit 554, and the processing proceeds to step S335.

In step S335, the size ratio determining unit 554 determines whether or not the subject is situated for a close-up shot, and specifically, whether or not the size ratio Fh/Hh from the size ratio calculating unit 553 is the same or generally the same as the ideal size ratio Fch/Hch to obtain a close-up shot.

In the event that determination is made in step S335 that the subject is not situated for a close-up shot, the lens position of the zoom lens is still between the telephoto end and the lens position LP6 in the driving range of the zoom lens in FIG. 27, and accordingly, the size ratio determining unit 554 supplies information for instructing to drive the zoom lens to the wide-angle side to the lens driving control unit 556, and the processing returns to step S332. Hereafter, the processing in steps S332 through S334 is repeated for each frame.

In the event that determination is made in step S335 that the subject is situated for a close-up shot, the lens position of the zoom lens has become between the lens positions LP6 through LP5 in the driving range of the zoom lens in FIG. 27, and accordingly, the size ratio determining unit 554 supplies information for instructing to stop driving of the zoom lens to the lens driving control unit 556, and the processing proceeds to step S320. In step S320, driving of the zoom lens stops as described above.

Thus, even in the event of imaging a subject positioned very near from the user, the user can image the subject with a suitable close-up shot by simply performing a zoom operation on the wide-angle side.

On the other hand, in the event that determination is made in step S331 that the size ratio is not greater than the ideal size ratio to obtain a close-up shot, the processing proceeds to step S336, the size ratio determining unit 554 determines whether or not the size ratio is greater than the ideal size ratio to obtain a bust shot. Specifically, determination is made whether or not the size ratio Fh/Hh from the size ratio calculating unit 553 is greater than the ideal size ratio Fbh/Hbh to obtain a bust shot.

In the event that determination is made in step S336 that the size ratio is greater than the ideal size ratio to obtain a bust shot, the lens position of the zoom lens is between the lens positions LP6 through LP4 in the driving range of the zoom lens in FIG. 27, and accordingly, the size ratio determining unit 554 supplies information for instructing to drive the zoom lens to the wide-angle side to the lens driving control unit 556, and the processing proceeds to step S337.

The processing in steps S337 through S340 is performed in the same way as the above-mentioned processing in steps S332 through S334, and accordingly, description thereof will be omitted.

In step S340, the size ratio determining unit 554 determines whether or not the subject is situated for a bust shot, and specifically, whether or not the size ratio Fh/Hh from the size ratio calculating unit 553 is the same or generally the same as the ideal size ratio Fbh/Hbh to obtain a bust shot.

In the event that determination is made in step S340 that the subject is not situated for a bust shot, the lens position of the zoom lens is still between the lens positions LP6 through LP4 in the driving range of the zoom lens in FIG. 27, and accordingly, the size ratio determining unit 554 supplies information for instructing to drive the zoom lens to the wide-angle side to the lens driving control unit 556, and the processing returns to step S337. Hereafter, the processing in steps S337 through S340 is repeated for each frame.

In the event that determination is made in step S340 that the subject is situated for a bust shot, the lens position of the zoom lens has become between the lens positions LP4 through LP3 in the driving range of the zoom lens in FIG. 27, and accordingly, the size ratio determining unit 554 supplies information for instructing to stop driving of the zoom lens to the lens driving control unit 556, and the processing proceeds to step S320. In step S320, driving of the zoom lens stops as described above.

Thus, even in the event of a subject being imaged with a close-up shot, the user can image the subject with a suitable bust shot by simply performing a zoom operation on the telephoto side.

On the other hand, in the event that determination is made in step S336 that the size ratio is not greater than the ideal size ratio to obtain a bust shot, the processing proceeds to step S341, the size ratio determining unit 554 determines whether or not the size ratio is greater than the ideal size ratio to obtain a full shot. Specifically, determination is made whether or not the size ratio Fh/Hh from the size ratio calculating unit 553 is greater than the ideal size ratio Fah/Hah to obtain a full shot.

In the event that determination is made in step S341 that the size ratio is greater than the ideal size ratio to obtain a full shot, the lens position of the zoom lens is between the lens positions LP4 through LP2 in the driving range of the zoom lens in FIG. 27, and accordingly, the size ratio determining unit 554 supplies information for instructing to drive the zoom lens to the wide-angle side to the lens driving control unit 556, and the processing proceeds to step S342.

The processing in steps S342 through S344 is performed in the same way as the above-mentioned processing in steps S332 through S334 and steps S337 through S339, and accordingly, description thereof will be omitted.

In step S345, the size ratio determining unit 554 determines whether or not the subject is situated for a full shot, and specifically, whether or not the size ratio Fh/Hh from the size ratio calculating unit 553 is the same or generally the same as the ideal size ratio Fah/Hah to obtain a full shot.

In the event that determination is made in step S345 that the subject is not situated for a full shot, the lens position of the zoom lens is still between the lens positions LP4 through LP2 in the driving range of the zoom lens in FIG. 27, and accordingly, the size ratio determining unit 554 supplies information for instructing to drive the zoom lens to the wide-angle side to the lens driving control unit 556, and the processing returns to step S342. Hereafter, the processing in steps S342 through S344 is repeated for each frame.

In the event that determination is made in step S345 that the subject is situated for a full shot, the lens position of the zoom lens has become between the lens positions LP2 through LP1 in the driving range of the zoom lens in FIG. 27, and accordingly, the size ratio determining unit 554 supplies information for instructing to stop driving of the zoom lens to the lens driving control unit 556, and the processing proceeds to step S320. In step S320, driving of the zoom lens stops as described above.

Thus, even in the event of a subject being imaged with a bust shot, the user can image the subject with a suitable full shot by simply performing a zoom operation on the wide-angle side.

On the other hand, in the event that determination is made in step S341 that the size ratio is not greater than the ideal size ration to obtain a full shot, i.e., in the event that the lens position of the zoom lens is in the wide-angle side than the lens position LP1 in the driving range of the zoom lens in FIG. 27, any processing is not performed. In this case, the subject is being imaged with a full shot or a more distant (away) shot than this, and accordingly, even in the event that a zoom operation on the wide-angle side is performed, there is no need to perform zooming out more than this.

According to the above-mentioned processing, at the time of a zoom operation being performed, according to the content of the zoom operation, driving of the zoom lens is controlled so that the size ratio between the subject region and the face region approximates to a predetermined ideal size ratio. Consequently, the imaging range can be adjusted so that the subject becomes a suitable shot such as a full shot, a bust shot, a close-up shot, or the like according to the content of the zoom operation regardless of the shot of the subject (person). That is to say, the size of the subject in the imaging range may be changed to a desired size without performing a delicate zoom operation.

Also, with the above-mentioned specified zoom processing, the size ration has been calculated using the heights or widths of the subject region and face region, but as shown in the images a through c in FIG. 27, changes in the value of the size ratio markedly appear at the time of using the height of each of the regions, and accordingly, in the event that the subject is a person, the height of each of the regions is advantageous to comparison and determination as to an ideal size ratio.

Note that, with the above-mentioned specified zoom processing, the imaging range has been adjusted according to a ratio between a person serving as a subject, and the size of a face that is a part of the subject thereof, but the present invention may be applied to a subject whereby the entire subject and a part thereof can be detected. For example, a face detector for detecting faces, and a face part detector for detecting face parts such as an eye, nose, and so forth are provided, whereby the image range can be adjusted so that the size of a face in the imaging range becomes a desired size.

Figure 16:
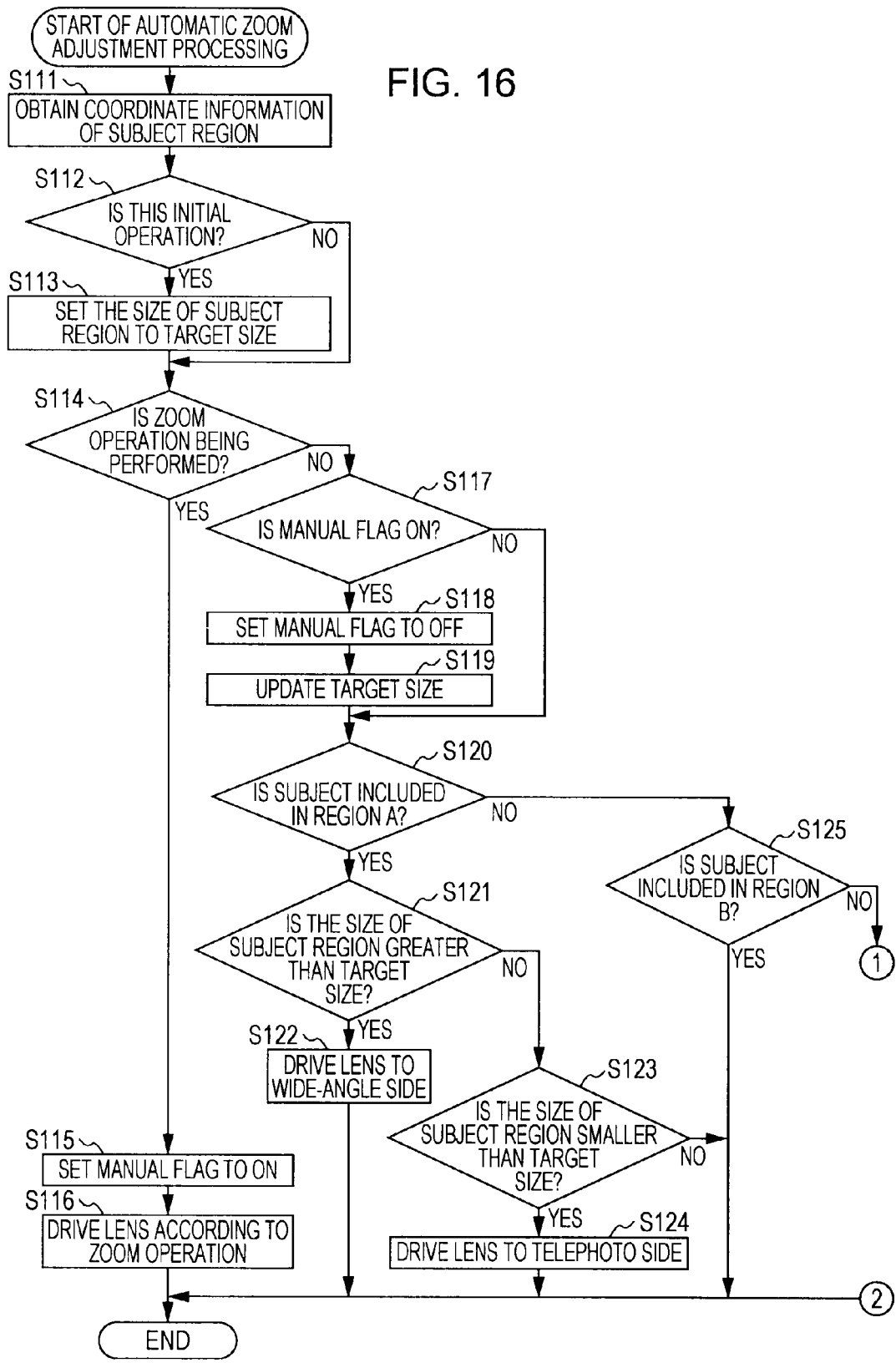
FIG. 16 is a flowchart for describing automatic zoom adjustment processing.
Figure 17:
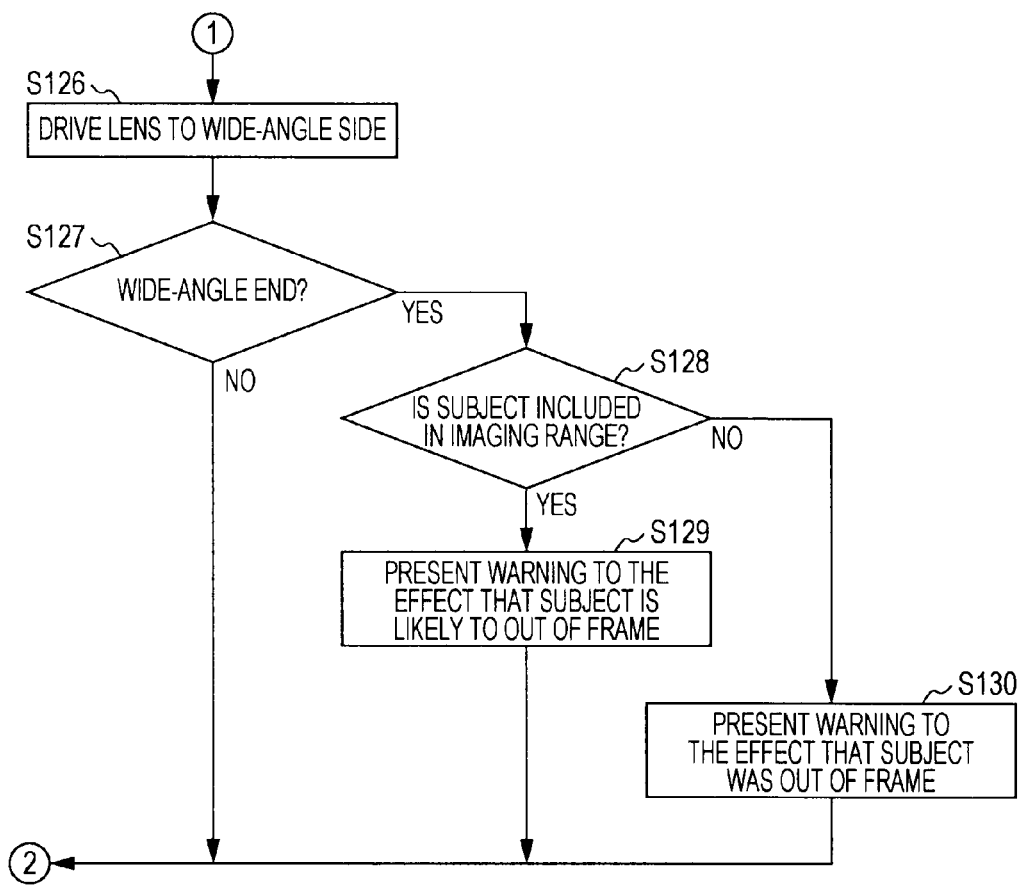
FIG. 17 is a flowchart for describing the automatic zoom adjustment processing.

Also, the above-mentioned specified zoom processing may be executed at the time of a zoom operation by the user being performed in the automatic zoom adjustment processing described in FIG. 16 and FIG. 17.

[Another Configuration Example of Image Processing Device]

Now, description will be made regarding a configuration example of the imaging processing device which executes the specified zoom processing at the time of a zoom operation by the user being performed in the automatic zoom adjustment processing, with reference to FIG. 28.

Figure 28:
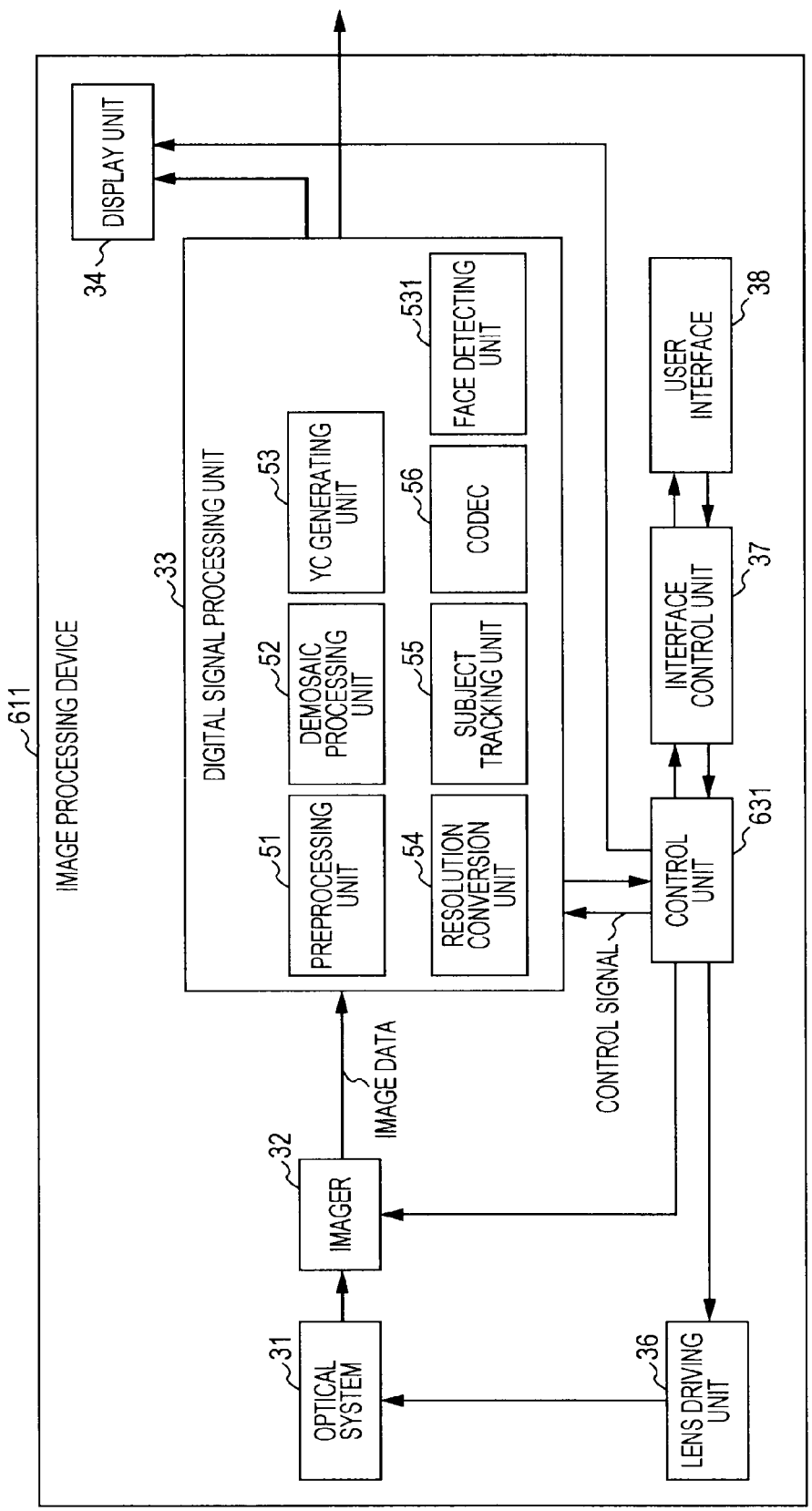
FIG. 28 is a block diagram illustrating yet another configuration example of the image processing device.

Note that, with the image processing device 611 in FIG. 28, configurations having the same functions as provided to the image processing device 511 in FIG. 22 will be denoted with the same names and same reference numerals, and description thereof will be omitted as appropriate.

Specifically, the image processing device 611 in FIG. 28 differs from the image processing device 511 in FIG. 22 in that a control unit 631 is provided instead of the control unit 532.

[Functional Configuration Example of Control Unit]

Now, a functional configuration example of the control unit 631 in FIG. 28 will be described with reference to FIG. 29.

Figure 29:
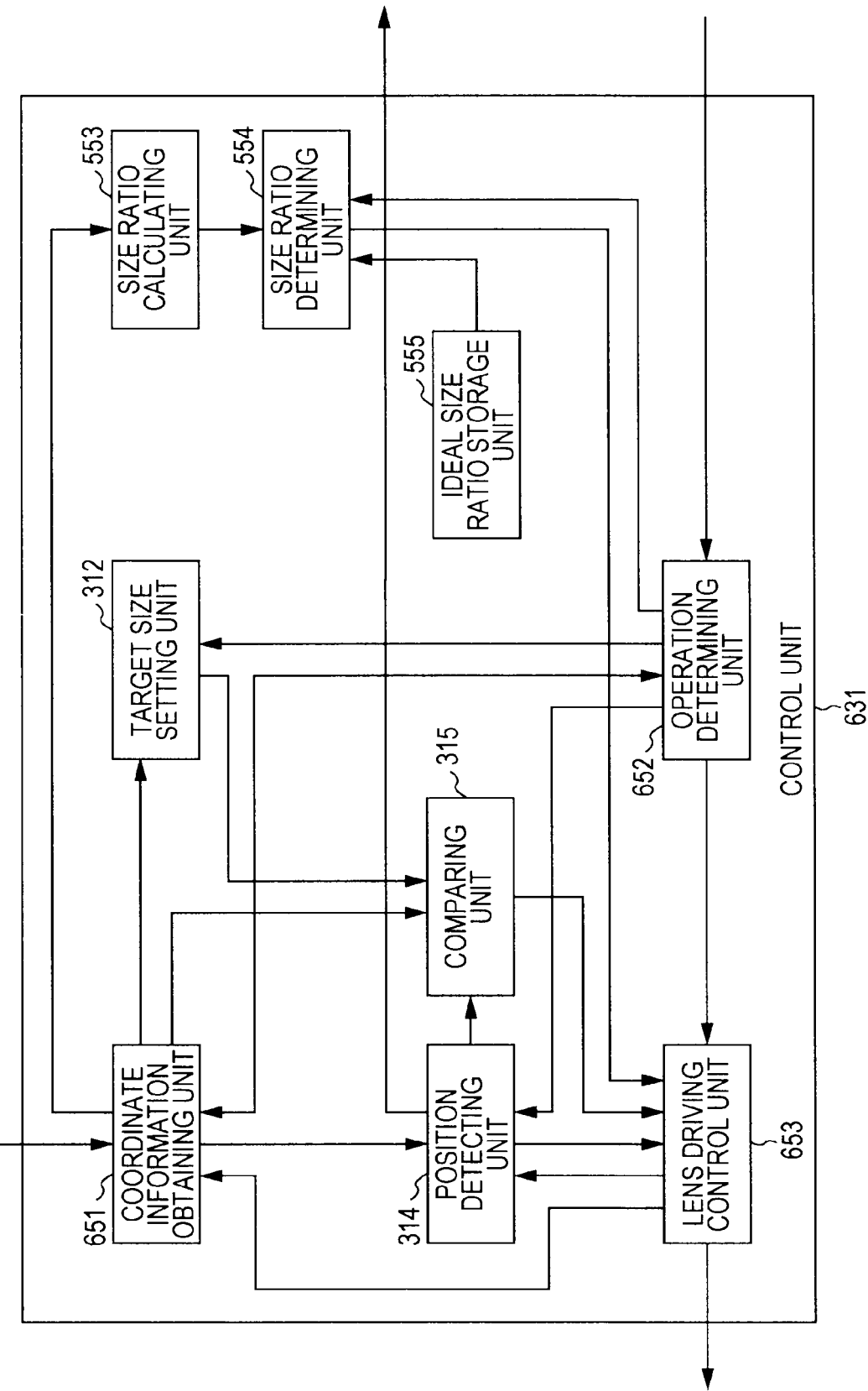
FIG. 29 is a block diagram illustrating a functional configuration example of the control unit in FIG. 28.

Note that, with the control unit 631 in FIG. 29, configurations having the same function as provided to the control unit 35 in FIG. 15 will be denoted with the same names and same reference numerals, and description thereof will be omitted as appropriate.

Specifically, the control unit 631 in FIG. 29 differs from the control unit 35 in FIG. 15 in that a size ratio calculating unit 553, a size ratio determining unit 554, and an ideal size ratio storage unit 555 are newly provided, and instead of the coordinate information obtaining unit 311, operation determining unit 313, and lens driving control unit 316, a coordinate information obtaining unit 651, an operation determining unit 652, and a lens driving control unit 653 are provided.

Also, with the control unit 631 in FIG. 29, the size ratio calculating unit 553, size ratio determining unit 554, and ideal size ratio storage unit 555 are the same as those provided to the control unit 532 in FIG. 23, and accordingly, description thereof will be omitted.

With the control unit 631 in FIG. 29, the coordinate information obtaining unit 651 includes the same function as the coordinate information obtaining unit 311 in FIG. 15, and further includes the same function as the coordinate information obtaining unit 552 in FIG. 23.

The operation determining unit 652 includes the same function as the operation determining unit 313 in FIG. 15, and further includes the same function as the operation determining unit 551 in FIG. 23.

The lens driving control unit 653 includes the same function as the lens driving control unit 316 in FIG. 15, and further includes the same function as the lens driving control unit 556 in FIG. 23.

[Automatic Zoom Adjustment Processing]

Next, the automatic zoom adjustment processing by the control unit 631 in FIG. 29 will be described with reference to the flowcharts in FIG. 30 and FIG. 31.

Figure 30:
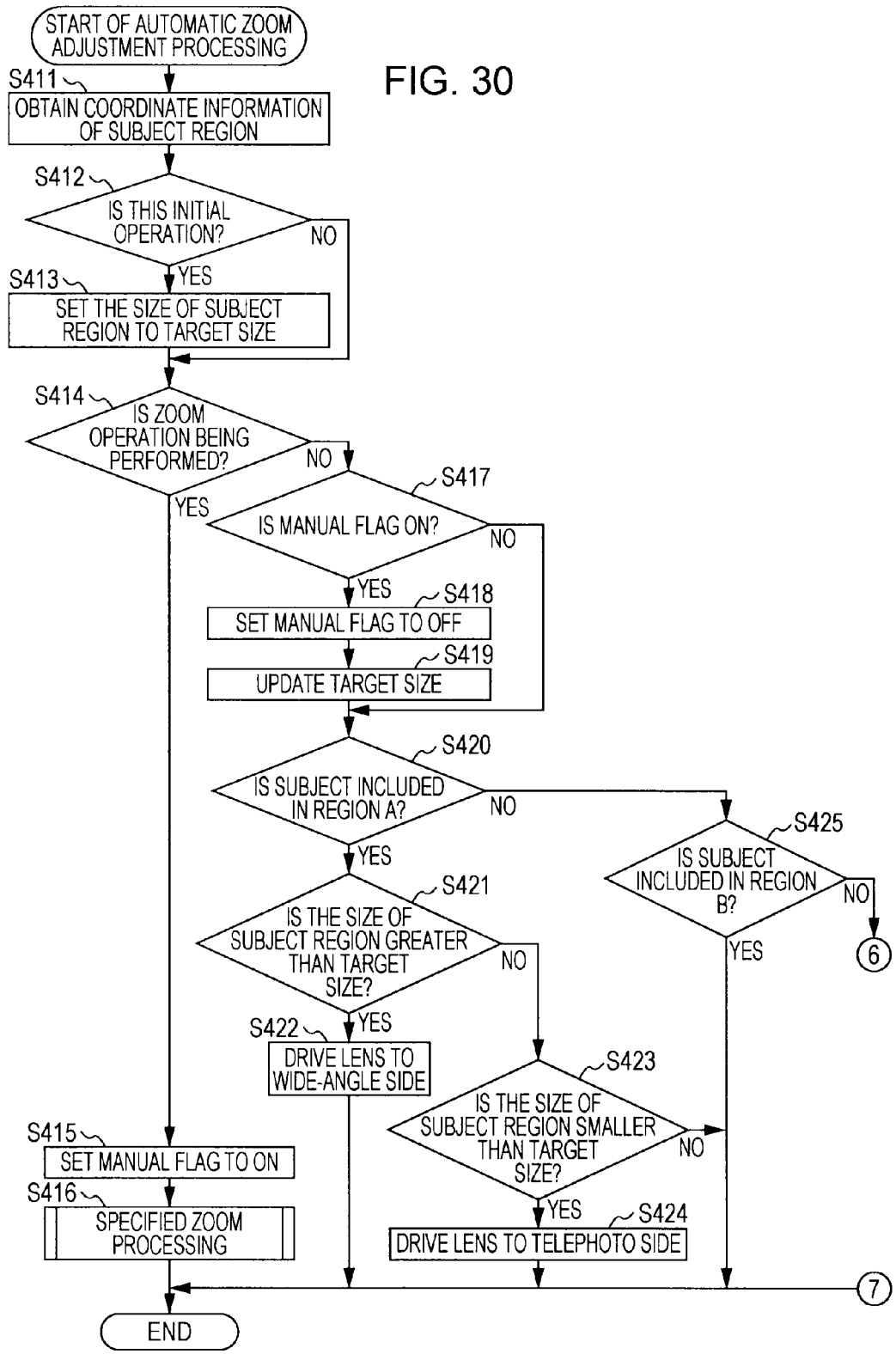
FIG. 30 is a flowchart for describing automatic zoom adjustment processing.
Figure 31:
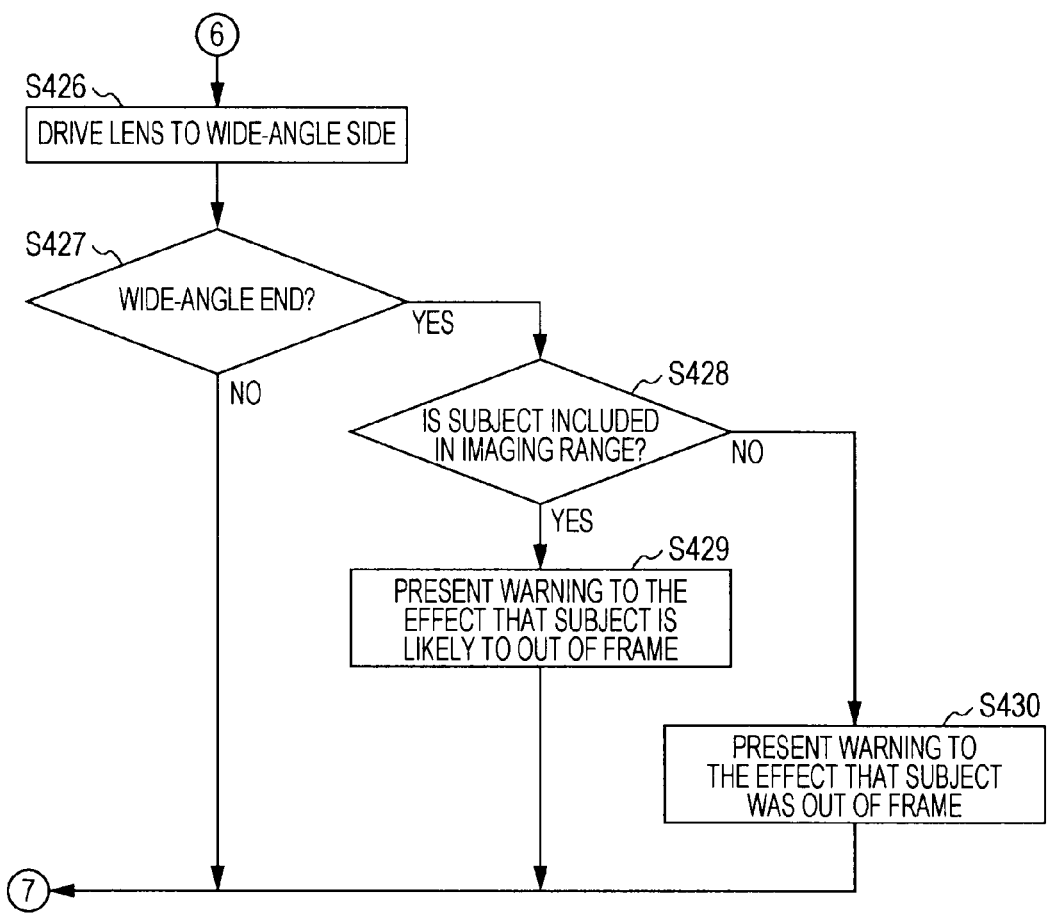
FIG. 31 is a flowchart for describing the automatic zoom adjustment processing.

Note that the processing in steps S411 through S415, and S417 through S430 in the flowcharts in FIG. 30 and FIG. 31 is basically the same as the processing in steps S111 through S115, and S117 through S130 in the flowcharts in FIG. 16 and FIG. 17, and accordingly, description thereof will be omitted.

Specifically, in step S416, the control unit 631 executes the specified zoom processing.

[Specified Zoom Processing]

Figure 32:
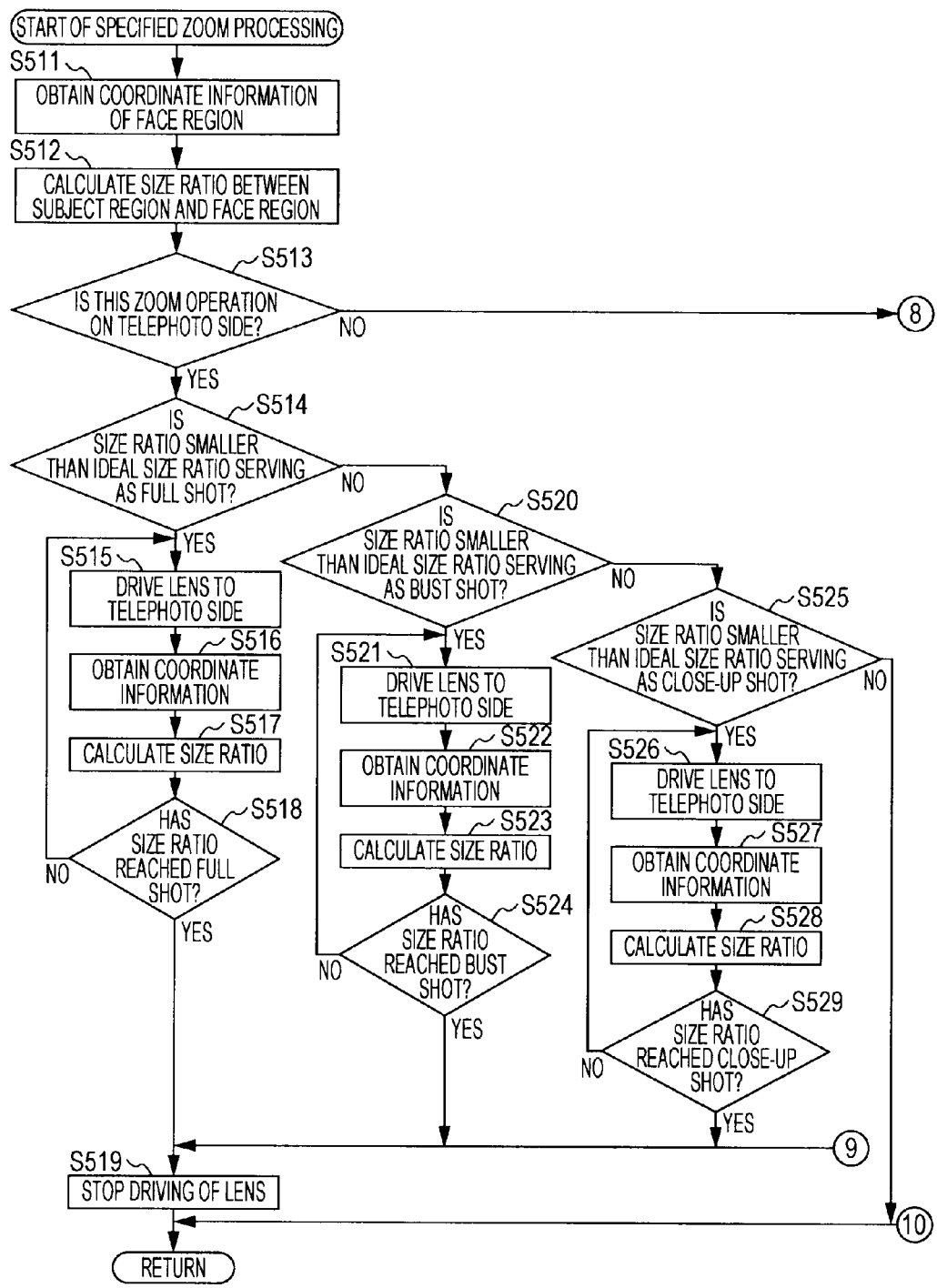
FIG. 32 is a flowchart for describing specified zoom processing.
Figure 33:
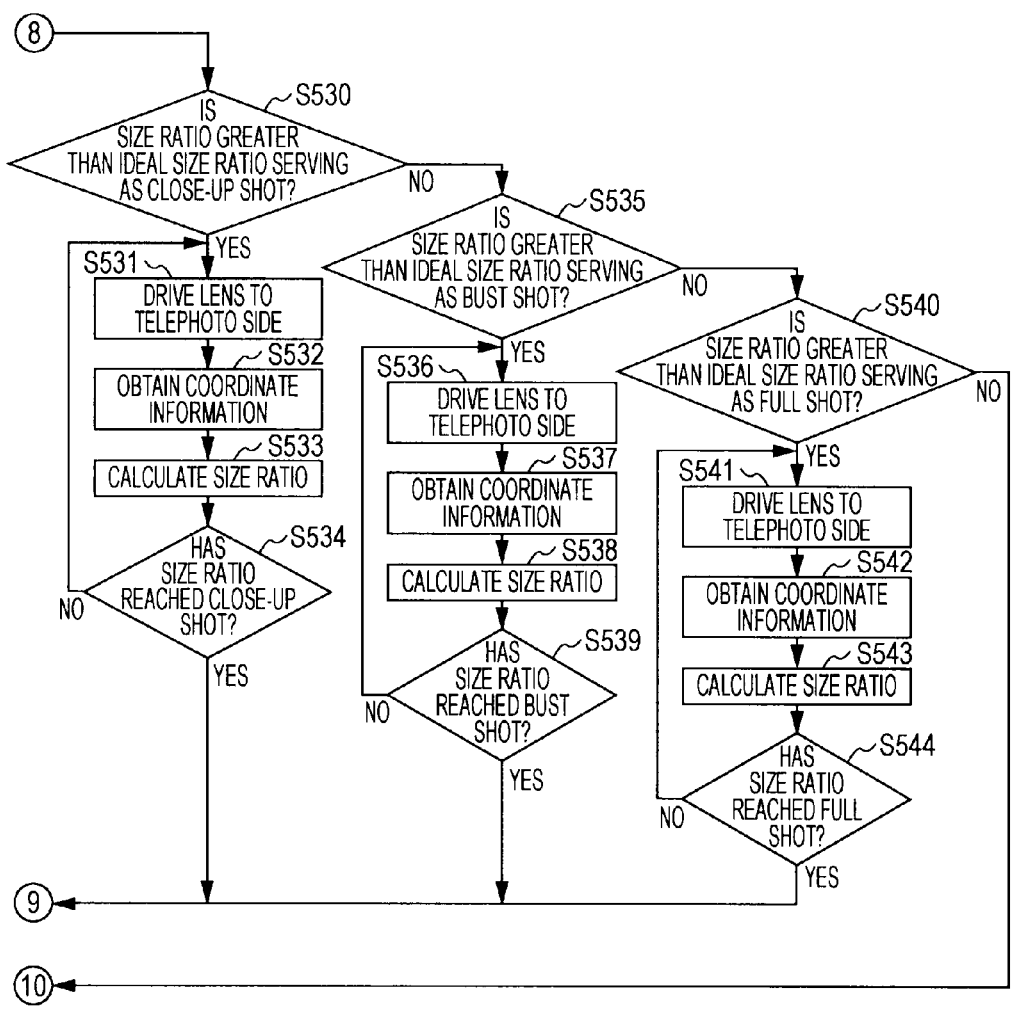
FIG. 33 is a flowchart for describing the specified zoom processing.

Next, the specified zoom processing by the control unit 631 in FIG. 29 will be described with reference to the flowcharts in FIG. 32 and FIG. 33.

In step S511, upon the information to the effect that a zoom operation has been performed by the user being supplied from the operation determining unit 652, the coordinate information obtaining unit 651 obtains the coordinate information of the face region from the face detecting unit 531 regarding a predetermined frame, and supplies to the size ratio calculating unit 553. That is to say, the coordinate information of the subject region from the subject tracking unit 55 has been obtained in step S411 in the flowchart in FIG. 30, and accordingly, the coordinate information obtaining unit 651 obtains only the coordinate information of the face region.

Figure 26:
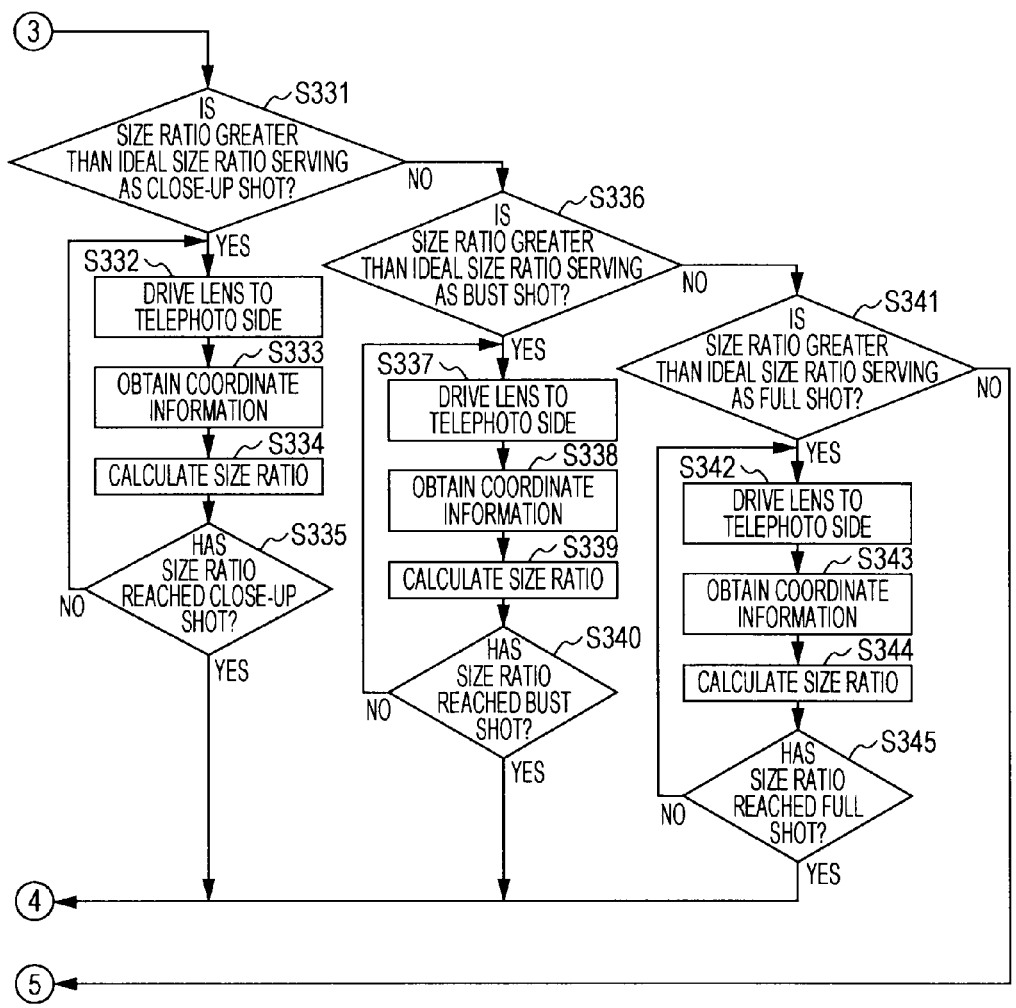
FIG. 26 is a flowchart for describing the specified zoom processing.

Note that the processes in step S512 and thereafter in the flowcharts are basically the same as the processes in step S313 and thereafter in the flowcharts in FIG. 25 and FIG. 26, and accordingly, description thereof will be omitted.

Also, the specified zoom processing is executed across multiple frames until the size ratio becomes generally the same as an ideal size ratio. The automatic zoom adjustment processing shown in FIG. 30 and FIG. 31 is basically executed for each frame, but in step S416 the specified zoom processing is executed across multiple frames, and the processing returns to the automatic zoom adjustment processing.

According to the above-mentioned processing, in the event that the size of the subject region is greater than the target size, the zoom lens can be driven to the wide-angle side so as to perform zooming out, and in the event that the size of the subject region is smaller than the target size, the zoom lens can be driven to the telephoto side so as to perform zooming in. Accordingly, even in the event that distance as to a subject changes at the time of imaging, the size of the subject in the imaging range can be held generally constant without performing a delicate zoom operation.

Also, in the event that a zoom operation has been performed by the user, driving of the zoom lens is controlled so that the size ratio between the subject region and the face region approximates to a predetermined ideal size ratio according to the content of the zoom operation. Consequently, the imaging range can be adjusted so that the subject becomes a suitable shot such as a full shot, a bust shot, a close-up shot, or the like according to the content of the zoom operation regardless of the shot of a person serving as the subject. That is to say, the size of the subject in the imaging range may be changed to a desired size without performing a delicate zoom operation.

After the zoom operation by the user is completed, the size of the subject region that has become a desired size is updated as the target size, and accordingly, even in the event that distance as to the subject changes, the size of the subject in the imaging range can be held generally constant with a desired size (shot).

As described above, the subject can be imaged in a simpler manner with a desired imaging range.

Note that, with the above description, the subject tracking unit 55 for detecting and tracking a subject region has been provided to the image processing device, but another subject detecting unit may be provided as long as a subject can be detected for each frame.

Also, with the above-mentioned automatic zoom adjustment processing, what we might call an optical zoom has been adjusted by controlling driving of the zoom lens, but what we might call an electronic zoom may be adjusted by enlarging an image using image processing.

[Yet Another Functional Configuration Example of Control Unit]

Now, description will be made regarding the functional configuration example of the control unit of the image processing device configured to adjust electronic zoom, with reference to FIG. 34.

Figure 34:
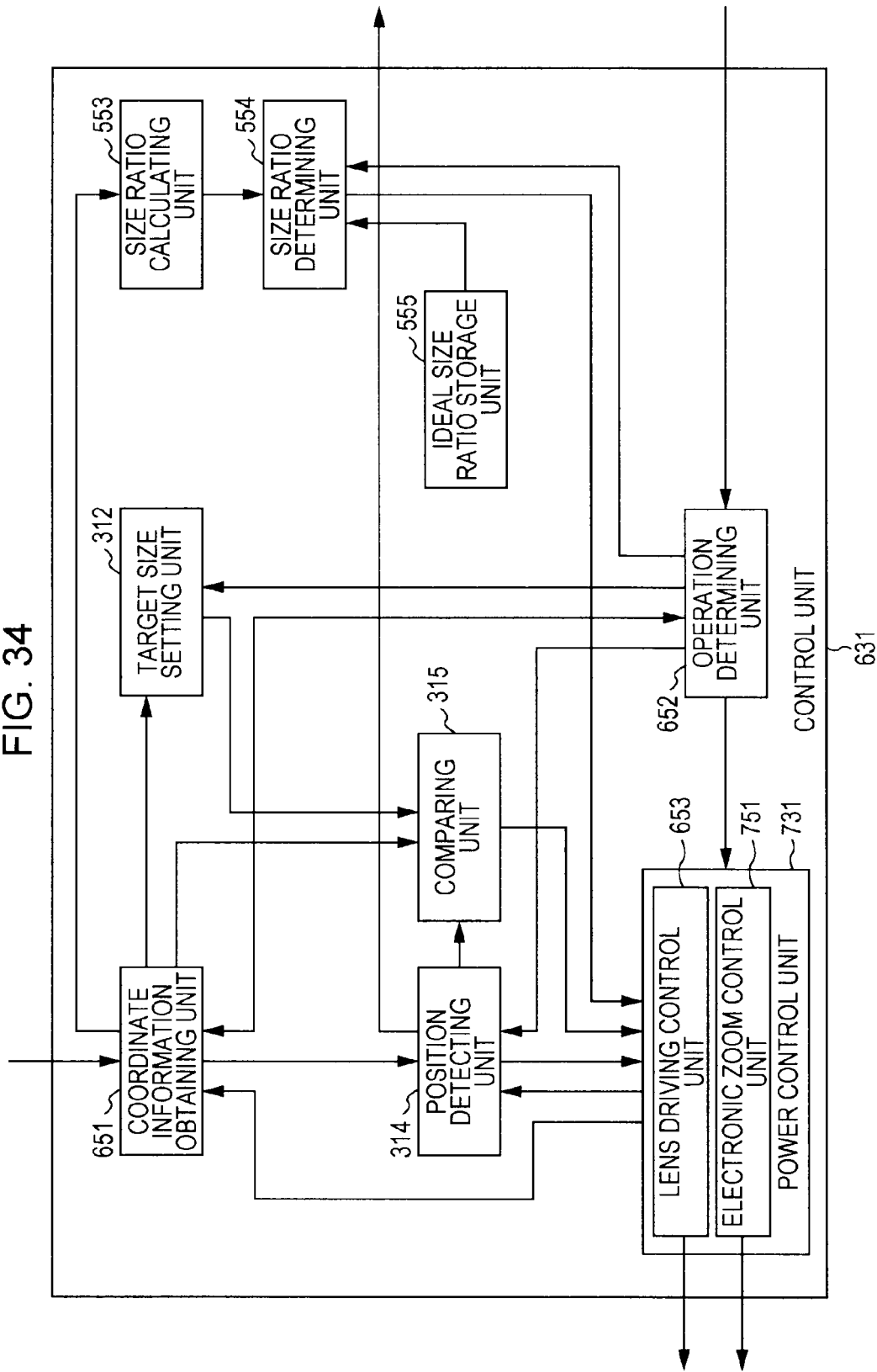
FIG. 34 is a block diagram illustrating yet another configuration example of the image processing device.

Note that, with the control unit 631 in FIG. 34, configurations having the same function as provided to the control unit 631 in FIG. 29 will be denoted with the same names and same reference numerals, and description thereof will be omitted as appropriate.

Specifically, the control unit 631 in FIG. 34 differs from the control unit 631 in FIG. 29 in that a power control unit 731 is provided instead of the lens driving control unit 653.

The power control unit 731 includes a lens driving control unit 653, and an electronic zoom control unit 751.

The lens driving control unit 653 has the same function as that provided to the control unit 631 in FIG. 29, and accordingly, description thereof will be omitted.

The electronic zoom control unit 751 controls the resolution conversion unit 54 to change the power of an input image (imaged image) to be displayed on the display unit 34 using image data based on information representing the determination result from the operation determining unit 313, and information representing the comparison result from the comparing unit 315. Also, the electronic zoom control unit 751 controls the resolution conversion unit 54 to change the power of an input image to be displayed on the display unit 34 using image data based on information representing the comparison result from the size ratio determining unit 554.

The control unit 631 in FIG. 34 may have the same operation effect as with the control unit 631 in FIG. 29. Note that automatic zoom adjustment processing by the control unit 631 in FIG. 34 is basically the same processing as the processing of the control unit 631 in FIG. 29 described with reference to the flowcharts in FIG. 30 through FIG. 33, and accordingly, description thereof will be omitted. In particular, even in the event that the lens position of the zoom lens becomes the telephoto end by the control of the lens driving control unit 653, the image may be enlarged further on the telephoto side by the control of the electronic zoom control unit 751, and accordingly, the adjustment width of the imaging range may be widened.

Note that description has been made so far assuming that the imaging processing device to which the present invention has been applied includes an imaging apparatus such as a digital video camera, digital still camera, or the like which images a subject with a motion, but the present invention is not restricted to the imaging apparatuses, and may be applied to an image processing device which outputs a moving image input from a predetermined information processing device to an output device such as a display device or the like.

The above-mentioned series of processing may be executed by hardware, and may also be executed by software. In a case of executing the series of processing by software, a program making up the software thereof is installed from a program recording medium to a computer embedded in dedicated hardware, or a device capable of executing various functions by various types of programs being installed, such as a general-purpose personal computer for example.

FIG. 35 is a block diagram illustrating a configuration example of the hardware of the computer which executes the above-mentioned series of processing using the program.

With the computer, a CPU (Central Processing Unit) 901, ROM (Read Only Memory) 902, and RAM (Random Access Memory) 903 are mutually connected by a bus 904.

The bus 904 is further connected with an input/output interface 905. The input/output interface 905 is connected with an input unit 906 made up of a keyboard, a mouse, a microphone, and so forth, an output unit 907 made up of a display, a speaker, and so forth, a storage unit 908 made up of a hard disk, nonvolatile memory, and so forth, a communication unit 909 made up of a network interface and so forth, and a drive 910 which drives a removable medium 911 such as a magnetic disk, optical disc, magneto-optical disk, semiconductor memory, or the like.

With the computer configured as described above, the above-mentioned series of processing is performed by the CPU 901 loading the program stored in the storage unit 908 to the RAM 903 via the input/output interface 905 and bus 904, and executing this.

The program that the computer (CPU 901) executes is provided by being recorded in the removable medium 911 which is a package medium made up of, for example, a magnetic disk (including a flexible disk), optical disc (CD-ROM (Compact Disc-Read Only Memory), DVD (Digital Versatile Disc), etc.), a magneto-optical disk, or semiconductor memory, or the like, or alternatively provided via a cable or wireless transmission medium such a local area network, the Internet, and digital satellite broadcasting.

The program may be installed in the storage unit 908 via the input/output interface 905 by mounting the removable medium 911 on the drive 910. Also, the program may be received at the communication unit 909 via a cable or wireless transmission medium, and installed in the storage unit 908. In addition, the program may be installed in the ROM 902 or storage unit 908 beforehand.

Note that the program that the computer executes may be a program to be processed in chronological order along with the order described in the present Specification, or may be a program to be processed in parallel, or at necessary timing such as when call-up is performed or the like.

Also, the embodiments of the present invention are not restricted to the above-mentioned embodiments, and various modifications may be made without departing from the essence of the present invention.

REFERENCE SIGNS LIST

11 image processing device
34 display unit
35 control unit
55 subject tracking unit
71 subject map generating unit
72 subject candidate region to rectangle conversion unit
73 subject region selecting unit
74 weight coefficient calculating unit
111 feature amount map generating unit
112 band feature amount map generating unit
113 band feature amount map synthesizing unit
114 synthesized feature amount map synthesizing unit
131 binarizing processing unit
132 labeling processing unit
133 rectangular region coordinate calculating unit
134 region information calculating unit
151 region information comparing unit
152 subject region determining unit
200 input image
201 subject map
221, 222 rectangular region
231 subject frame
311 coordinate information obtaining unit
312 target size setting unit
313 operation determining unit
314 position detecting unit
315 comparing unit
316 lens driving control unit
511 image processing device
531 face detecting unit
532 control unit
551 operation determining unit
552 coordinate information obtaining unit
553 size ratio calculating unit
554 size ratio determining unit
555 ideal size ratio storage unit
556 lens driving control unit
631 control unit
651 coordinate information obtaining unit
652 operation determining unit
653 lens driving control unit
731 power control unit
751 electronic zoom control unit

The invention claimed is:

1. An image processing device comprising:
circuitry configured to:
calculate a ratio between a first size of an interest region that is a region of an interest subject, and a second size of a partial region that is a region of a portion of said interest subject included in said interest region, of an image, said interest region being a part of said image less than an entire region of said image;
compare the first size of said interest region, and a predetermined target size of said image; and control a zoom of said image so that said ratio calculated by said circuitry, and a predetermined value match or generally match, and that a difference between the first size of said interest region, and said predetermined target size is smaller than a predetermined threshold.

2. The image processing device according to claim 1, further comprising:
a memory that stores said predetermined value beforehand; wherein
said circuitry is configured to:
determine whether or not said ratio calculated by said circuitry, and said predetermined value stored by said memory match or generally match, for each frame; and
control said zoom until determination is made that said ratio and said predetermined value match or generally match.

3. The image processing device according to claim 1, wherein said circuitry calculates said ratio by calculating a ratio between the heights of said interest region, and said partial region serving as rectangular regions.

4. The image processing device according to claim 1, wherein said circuitry calculates said ratio by calculating a ratio between a person region that is a region of a person serving as said interest subject of interest, and a face region that is a region of a face of said person included in said person region, of said image.

5. The image processing device according to claim 1, wherein said circuitry controls said zoom of said image by controlling driving of a zoom lens.

6. The image processing device according to claim 1, wherein said circuitry controls said zoom of said image by controlling electronic enlargement of said image.

7. An image processing device comprising:
circuitry configured to:
calculate a ratio between a first size of an interest region that is a region of an interest subject, and a second size of a partial region that is a region of a portion of said interest subject included in said interest region, of an image, said interest region being a part of said image less than an entire region of said image;
compare the first size of said interest region, and a predetermined target size of said image;
control a zoom of said image according to a zoom operation by a user so that said ratio calculated by said circuitry, and a predetermined value match or generally match, and that a difference between the first size of said interest region, and said predetermined target size is smaller than a predetermined threshold; and
control, in the event that the zoom operation has not been performed by said user, said zoom of said image so that the difference between the first size of said interest region and said predetermined target size compared by said circuitry is smaller than the predetermined threshold.

8. The image processing device according to claim 7, wherein said circuitry is configured to:
control said zoom of said image according to said zoom operation at the time of the zoom operation being performed by said user while controlling said zoom of said image so that difference between the first size of said interest region, and said predetermined target size is smaller than said predetermined threshold; and
set said target size to a size of said interest region after the zoom operation has been performed by said user.

9. The image processing device according to claim 7, wherein said circuitry is configured to:

detect the position of said interest region in said image; and
control said zoom of said image toward the wide-angle side in the event that said circuitry detects that the position of said interest region is in an outer edge region of said image.

10. The image processing device according to claim 9, wherein said circuitry is configured to:
present information to the effect that said interest subject is out of said image in the event that said zoom of said image becomes a wide-angle end by the control of said circuitry.

11. An image processing method of an image processing device which includes circuitry,
said method comprising:
calculating, using said circuitry, a ratio between a first size of a person region that is a region of a person serving as an interest subject, and a second size of a face region that is a region of a face of said person included in said person region, of an image;
comparing, using said circuitry, the first size of said person region, and a predetermined target size of said image; and
controlling, using said circuitry, a zoom of said image so that said ratio calculated using said circuitry in said calculating, and a predetermined value match or generally match, and that a difference between the first size of said person region, and said predetermined target size is smaller than a predetermined threshold.

12. A non-transitory computer readable medium including executable instructions, which when executed by a computer cause the computer to execute an image processing method of an image processing device, the method comprising:
calculating a ratio between a first size of a person region that is a region of a person serving as an interest subject, and a second size of a face region that is a region of a face of said person included in said person region, of an image;
comparing, using said circuitry, the first size of said person region, and a predetermined target size of said image; and
controlling a zoom of said image so that said calculated ratio in said calculating, and a predetermined value match or generally match, and that a difference between the first size of said person region, and said predetermined target size is smaller than a predetermined threshold.

13. The image processing device according to claim 1, further comprising an imager that images the interest subject.

14. An image processing device comprising:
circuitry configured to:
calculate a ratio between a first size of an interest region that is a region of an interest subject, and a second size of a partial region that is a region of a portion of said interest subject included in said interest region, of an image, said interest region being a part of said image less than an entire region of said image; and
control a zoom of said image so that said ratio calculated by said circuitry, and a predetermined value match or generally match, wherein
when the zoom is on a telephoto side, and when said ratio is smaller than a first predetermined value, said circuitry controls said zoom of said image toward the telephoto side so that said ratio and the first predetermined value match or generally match, and
when the zoom is on the telephoto side, and when said ratio is not smaller than the first predetermined value, said circuitry controls said zoom of said image toward the telephoto side so that said ratio and a second predetermined value match or generally match.

15. An image processing device comprising:

circuitry configured to:

calculate a ratio between a first size of an interest region that is a region of an interest subject, and a second size of a partial region that is a region of a portion of said interest subject included in said interest region, of an image, said interest region being a part of said image less than an entire region of said image; and control a zoom of said image so that said ratio calculated by said circuitry, and a predetermined value match or generally match, wherein when the zoom is on a wide-angle side, and when said ratio is greater than a second predetermined value, said circuitry controls said zoom of said image toward the wide-angle side so that said ratio and the second predetermined value match or generally match, and when the zoom is on the wide-angle side, and when said ratio is not greater than the second predetermined value, said circuitry controls said zoom of said image toward the wide-angle side so that said ratio and a first predetermined value match or generally match.

16. An image processing device comprising:

circuitry configured to:

calculate a ratio between a first size of a person region that is a region of a person serving as an interest subject, and a second size of a face region that is a region of a face of said person included in said person region, of an image;

compare the first size of said person region, and a predetermined target size of said image; and control a zoom of said image so that said ratio calculated by said circuitry, and a predetermined value match or generally match, and that a difference between the first size of said person region, and said predetermined target size is smaller than a predetermined threshold.

17. The image processing device according to claim 16, further comprising an imager that images the interest subject.

* * * * *